United States Patent
Medina et al.

(10) Patent No.: US 11,526,211 B2
(45) Date of Patent: Dec. 13, 2022

(54) METHODS AND APPARATUS FOR CONTROLLING, IMPLEMENTING AND SUPPORTING TRICK PLAY IN AN AUGMENTED REALITY DEVICE

(71) Applicant: Nevermind Capital LLC, Wilmington, DE (US)

(72) Inventors: Hector Medina, Laguna Beach, CA (US); Alan McKay Moss, Laguna Beach, CA (US); David Cole, Aliso Viejo, CA (US)

(73) Assignee: Nevermind Capital LLC, Wilmington, DE (US)

( * ) Notice: Subject to any disclaimer, the term of this patent is extended or adjusted under 35 U.S.C. 154(b) by 0 days.

(21) Appl. No.: 16/401,707

(22) Filed: May 2, 2019

(65) Prior Publication Data

US 2019/0346933 A1 Nov. 14, 2019

Related U.S. Application Data

(60) Provisional application No. 62/668,778, filed on May 8, 2018.

(51) Int. Cl.
| | | |
|---|---|---|
| G06F 3/048 | (2013.01) | |
| G06F 3/01 | (2006.01) | |
| H04N 21/2387 | (2011.01) | |
| G06F 3/0346 | (2013.01) | |
| H04N 21/414 | (2011.01) | |
| G06T 19/00 | (2011.01) | |

(52) U.S. Cl.
CPC ............ *G06F 3/017* (2013.01); *G06F 3/0346* (2013.01); *G06T 19/006* (2013.01); *H04N 21/2387* (2013.01); *H04N 21/41407* (2013.01)

(58) Field of Classification Search
CPC ..... G06F 3/017; G06F 3/0346; G06T 19/006; H04N 21/2387; H04N 21/41407
See application file for complete search history.

(56) References Cited

U.S. PATENT DOCUMENTS

| | | | | |
|---|---|---|---|---|
| 5,742,521 | A * | 4/1998 | Ellenby | G01C 17/34 |
| | | | | 702/127 |
| 2012/0032877 | A1* | 2/2012 | Watkins, Jr. | G06F 3/017 |
| | | | | 345/156 |
| 2013/0141421 | A1* | 6/2013 | Mount | G02B 27/0172 |
| | | | | 345/419 |
| 2015/0006639 | A1* | 1/2015 | Huston | H04W 4/21 |
| | | | | 709/204 |
| 2015/0248792 | A1* | 9/2015 | Abovitz | G06F 3/011 |
| | | | | 345/633 |
| 2016/0139689 | A1* | 5/2016 | Sutton | G06F 3/016 |
| | | | | 386/282 |
| 2018/0101238 | A1* | 4/2018 | Thomas-Brigden | |
| | | | | H04N 21/482 |

* cited by examiner

*Primary Examiner* — William C Trapanese
(74) *Attorney, Agent, or Firm* — Blank Rome LLP

(57) ABSTRACT

Methods and Apparatus for controlling, implementing and supporting trick Play in an augmented reality (AR) device are described. Detected changes in AR device orientation and/or AR device position are detected and used in controlling temporal playback operations.

20 Claims, 16 Drawing Sheets

| FIGURE 10A | FIGURE 10B | FIGURE 10C | FIGURE 10D |

METHODS AND APPARATUS FOR CONTROLLING, IMPLEMENTING AND SUPPORTING TRICK PLAY IN AN AUGMENTED REALITY DEVICE

RELATED APPLICATIONS

The present application claims the benefit of U.S. Provisional Patent Application Ser. No. 62/668,778 filed May 8, 2018 which is hereby expressly incorporated by reference in its entirety.

FIELD

The present invention relates to playback devices capable of supporting augmented and/or virtual reality applications and more particularly to methods and apparatus for controlling temporal, e.g., time related, and/or normal playback operations in such devices.

BACKGROUND

Cell phones, e.g., smart phones, are sometimes used as augmented reality (AR) devices where an image captured by the cell phone is combined with other image content. The content may be video such as a movie or other image content. In some cases the content may be that of a sporting event such as a basketball game.

In many cases when being used as an augmented reality device the cell phone is held by a user and the user watches the combined video which was captured elsewhere with the image or images captured by the camera of the cell phone.

Because the camera of the phone is used to capture images which are combined with content that is to be displayed the user is limited in how he can manipulate the camera controls during an AR session. It can be difficult from a user perspective to try and manipulate sliders and/or other controls on the phone during an AR session since it may require movement of the phone to a position which either moves the camera to a position where it is no longer able to capture the area of the actual environment which was being used to frame the video content and/or because it may be difficult to view the screen of the phone while attempting to access a bottom or slider on the other side of the phone.

During AR sessions involving sporting events it may be desirable to control temporal aspects of the view being displayed as part of the AR session. For example, in the case of an AR session in which images of a sporting event are displayed, it may be desirable to be able to support instant playback, e.g., a short rewind and redisplay. It might also be desirable to enable fast forwarding through portions of the video being displayed in the AR session. Unfortunately, while a user is holding a cell phone, control of temporal aspects through sliders and/or other physical controls which might be used to control forward and reverse can be difficult to implement because of the position in which the phone is held during the AR session and/or because accessing sliders or other controls on the front or side of the phone might be difficult during the AR session without interrupting the AR experience in a meaningful way.

In view of the above discussion, it should be appreciated there is a need for methods and/or apparatus which allow a user to control temporal aspects of a AR experience without requiring a physical sliders, rotatable dials or multiple physical controls on the cell phone.

SUMMARY

Control of trick play, e.g., replay of an event is supported in various playback systems, e.g., augmented and/or virtual reality playback systems. In various embodiments while a user is viewing content as part of an augmented and/or virtual reality experience, the user is presented with a temporal control, e.g., a button on the touch sensitive screen of the cell phone, which can be used to switch the AR device, e.g., cell phone, into a motion based temporal control mode of operation. In some embodiments, the temporal control acts as a toggle between the normal mode of operation and the motion based temporal control mode of operation.

When in the temporal based motion mode of operation movement of the playback device is used to control temporal aspects of playback operation. In some embodiments, rotation of the playback device, e.g., cell phone around an axis or object visible in the field of view of a camera included in the playback device is detected using images captured by the camera in the playback device, e.g., cell phone and/or using sensors in the device such as gyroscopes and/or accelerometers. Rotation of the cell phone in a clockwise direction is interpreted in some embodiments as a command to fast forward, or skip in time forward. The rate of the rotation can be, and in some embodiments is, used to indicate a rate at which the fast forward operation is to occur. For example a fast turn to the right, e.g., clockwise, may be interpreted as 4× fast forward while a slow twist to the right might be, and sometimes is interpreted, as a 2× fast forward. In other embodiments the amount of rotation controls when fast forward or reverse is started during the motion based temporal control mode of operation and the amount of time the device stays rotated to a speed adjust position determines how fast the fast forward or reverse operation will progress at. For example by rotating the playback device a first amount clockwise a fast forward at a 2× rate may begin. By rotating the playback device further relative to the null or start position where the motion based temporal control mode was enabled will result in an adjustment in the speed of playback operation. For example by rotating the playback device a quarter turn to the right in one embodiment fast forward will continue to speed up until reaching a maximum speed. Rotating the control in the reverse direction will cause the fast forward to stop and/or slow down until a position is reached which causes normal playback operation to occur. The turning clock wise may be viewed as "turning on" the fast forward with the amount of clock wise turn, the duration for which the device is held in a turned state and/or the rate at which the clockwise turn is implemented controlling the fast forward speed. Turning the playback device counter clockwise can switch playback to normal or even reverse speed playback.

As with the clockwise rotation the amount, speed of rotation and/or amount of time which the device remains rotated counter clockwise may be used to control the rate of rewind operation, e.g., 1×, 2×, 4×, etc. up to some max supported rewind rate. Playback device rotation clockwise may be, and sometimes is, used to turn off and/or slow down the rewind rate.

Notably the camera of the playback device may keep a real world object such as a table in its field of view while playback device is rotated or moved and the user of the playback device can continue to hold the playback device with one or both hands while controlling temporal playback via movement of the playback device.

In some embodiments the playback involves displaying a captured object, area or surface with other content being displayed as being inserted into the captured object area or surface. For example a user may view an image or images of a table or other surface which is captured by a camera in the playback device with content being added to make it appear as if the added content is present in the environment where the table or other images of objects are captured by the camera of the playback device.

In some embodiments the added content is a representation of a sporting event, such as a basketball game, with the augmented reality providing the user a view of a real sporting event as if it was being played by scaled down players on a table top or other surface of an object in the environment where the playback device captures images. In one such embodiment a user of the AR playback device is given the impression as if miniature sports teams were playing an actual game of the table with the basket ball court or field appearing if it was located on the table surface in the room in which the AR playback device is located and in which the AR device captures the images of the displayed table or other surface in real time.

Once activated fast forward may continue until the user rotates the cell phone back toward the position where the temporal mode of operation was implemented. In another embodiment the amount of rotation to the right controls the fast forward rate, e.g., with a quarter turn to the right being interpreted as 2× fast forward and a full 180 degree rotation being 4× or a higher fast forward playback speed. Rotation back to the point at which the temporal mode of operation was initiated can, and sometimes does, return the device to a normal playback rate.

Rotating the cell phone counterclockwise, e.g., to the left, during motion controlled temporal mode of operation causes a rewind operation to be implemented. In some embodiments as with the fast forward operation the rate at which the rotation is implemented and/or the amount of counter clockwise rotation that is implemented controls the rewind rate.

In the above described manner rotation of the cell phone, e.g., around the optical axis of the camera included in the cell phone or other playback device, can be used to control fast-forward or rewind of content being displayed as part of an augmented reality session.

A motion control skip mode of operation is also supported in some AR embodiments. The motion controlled skip operation can be activated by touching a motion control skip touch screen button. Once in motion control skip mode of operation the amount of forward skip to be implemented can be and sometimes is controlled by the amount of clockwise rotation and/or the amount of backward skip implemented, e.g., skip steps sizes, can be controlled by the amount or rate of counterclockwise rotation. Skip operation can continue in the direction indicated by the user's counter clockwise or clockwise rotation until the user returns the cell phone to the position at which the motion controlled temporal skip operation was performed.

In some embodiments while other motion control features are disabled while temporal motion control is enabled for forward/reverse or skip operations, in other embodiments the temporal motion control does not interfere with other motion controlled operations and both temporal motion control of video playback in the AR session and whatever other motion control features are supported will both be controlled based on the detected cell phone motion.

An exemplary method of operating an augmented reality (AR) device, e.g., a cell phone such as a smart phone with a camera and display, in accordance with some embodiments, comprises: displaying, as part of a first mode of operation, an image including content captured by a camera included in said AR device and at least some additional image content; detecting user input indicating activation of a temporal replay enabled mode of operation control; and switching from said first mode of operation to a temporal replay enabled mode of operation in response to detecting activation of the temporal replay enabled mode of operation control. In some such embodiments, the method further comprises detecting a change in AR device orientation or AR device position; and controlling a temporal playback operation (e.g., fast forward or reverse of the additional image content being displayed with the captured image content) based on the detected change in AR device orientation or AR device position, while in said temporal replay enabled mode of operation.

Numerous variations on the above described methods and apparatus are possible. While various embodiments have been discussed in the summary above, it should be appreciated that not necessarily all embodiments include the same features and some of the features described above are not necessary for all embodiments. Numerous additional features, embodiments and benefits of various embodiments are discussed in the detailed description which follows.

DETAILED DESCRIPTION

Figure 1:
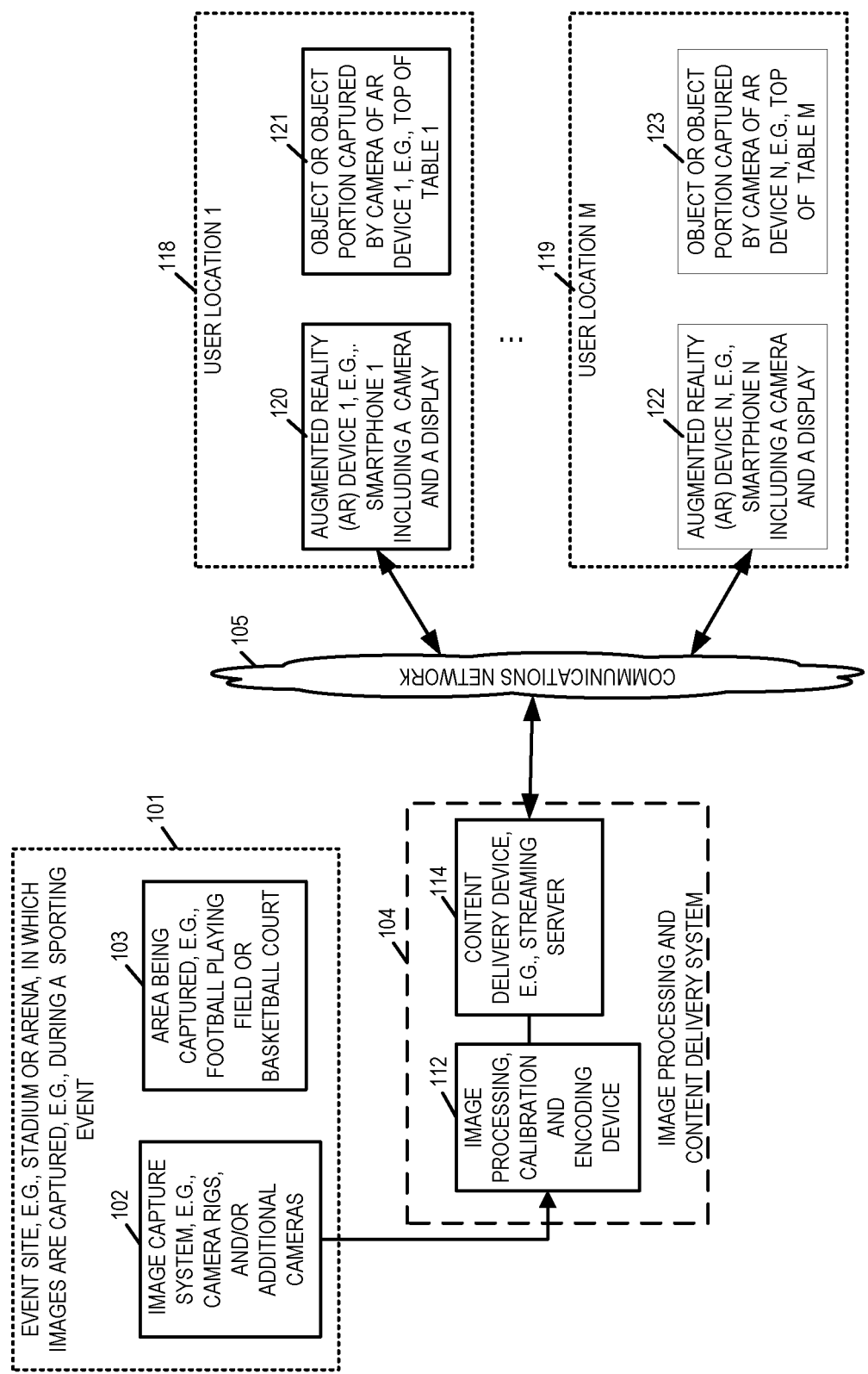
FIG. 1 is a drawing of an exemplary system in accordance with an exemplary embodiment.

FIG. 1 is a drawing of an exemplary system 100 in accordance with an exemplary embodiment. Exemplary system 100 includes an image capture system 102, a image processing and content delivery system 104, a communications network 105, and a plurality of playback devices, e.g., augmented reality (AR) or virtual reality devices. While the control methods and apparatus of the invention can be used with both augmented reality devices and virtual reality devices, they will be explained in the context of an augmented reality layback device example. It should be appreciated that a virtual reality device embodiment would not require the capture and display of at least portions of images by the playback device with the augmented realty device normally displaying some playback device captured content with additional content. Augmented reality device 1 120, . . . , augmented reality device N 122) are coupled together as shown in FIG. 1 and can receive additional content which can be merged or displayed with image content captured by the individual playback device in the location where it is physically located. The image capture system 102 includes, e.g., camera rigs, e.g., camera rig including one or more cameras and/or additional cameras, for capturing images during an event, e.g., a sporting event, and transmitting the captured images. The image capture system 102 is located at an event site 101, e.g., a stadium or arena, in which images are captured during a sporting event. The event site 101 includes an area 103 being captured, e.g., a football playing field or a basketball court.

The image processing and content delivery system 104 includes an image processing, calibration and encoding device 112 and a content delivery device, e.g., a streaming server, coupled together as shown in FIG. 1. In some embodiments, the image processing, calibration and encoding device 112 and the content delivery device 114 are included in a single device. Captured images supplied by the image processing and content delivery system 104 are send to and used as additional content by the AR devices (120, . . . 122).

Augmented reality (AR) device 1 120 is, e.g., smart phone 1 including a camera and a display. AR device 1 120 is located at user location 1 118. User location 1 118 includes an object or object portion 121 captured by a camera of AR device 1 120. In one exemplary embodiment, the object portion 121 is the top of table 1. An AR image displayed on the display of AR device 1 120 may, and sometimes does, include image content captured by the camera of AR device 1 120, e.g., a portion of table top 1, and at least some additional content, e.g., image content of the playing field of a sporting event, which was captured by image capture system 102. In one exemplary embodiment, the playing field including players is shown as if it was miniaturized and located on the top of table 1.

Augmented reality (AR) device N 122 is, e.g., smartphone 2 including a camera and a display. AR device 2 122 is located at user location M 119. User location M 119 includes an object or object portion 123 captured by a camera of AR device N 122. In one exemplary embodiment, the object portion 123 is the top of table M. An AR image displayed on the display of AR device N 122 may, and sometimes does, include image content captured by the camera of AR device N 122, e.g., a portion of table top M, and at least some additional content, e.g., image content of the playing field of a sporting event, which was captured by image capture system 102. In one exemplary embodiment, the playing field including players is shown as if it was miniaturized and located on the top of table M.

Figure 2C:
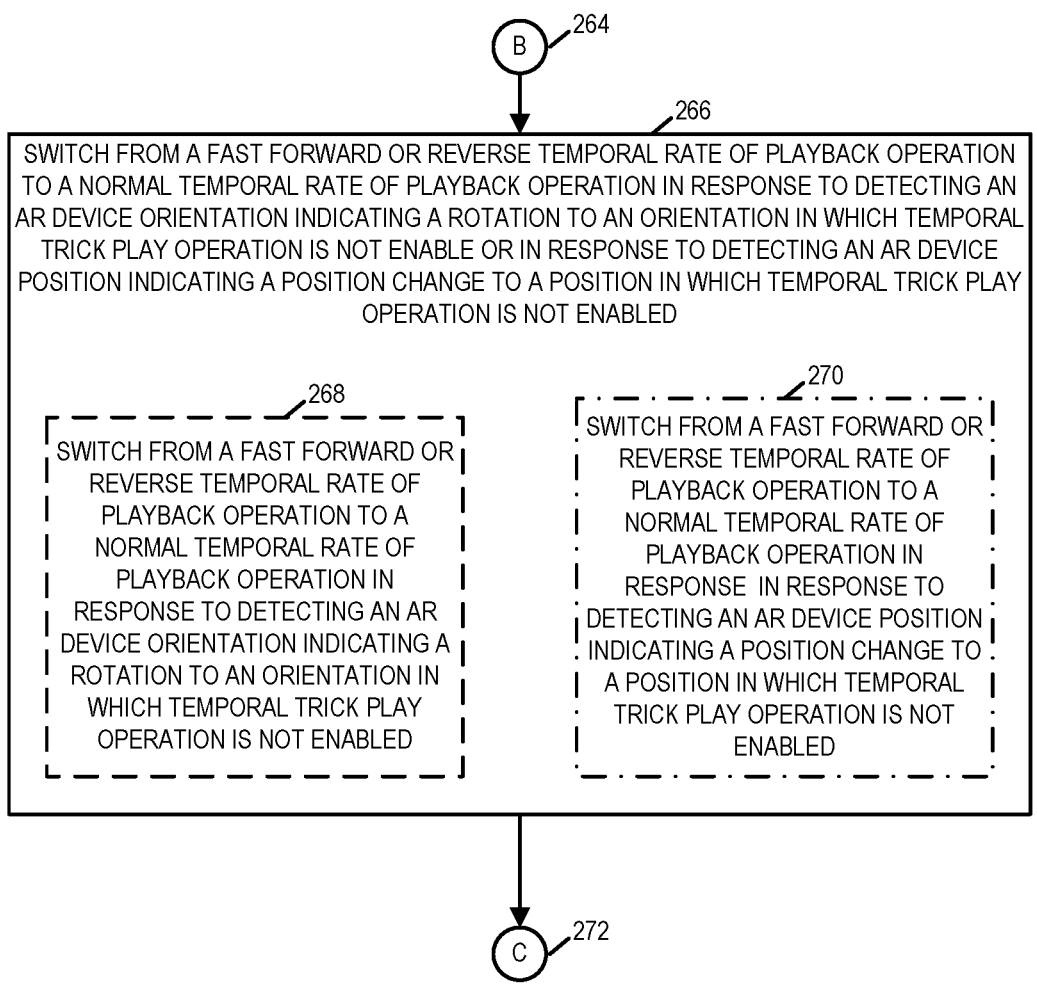
FIG. 2C is a third part of a flowchart of an exemplary method of operating an augmented reality device in accordance with an exemplary embodiment.
Figure 2:
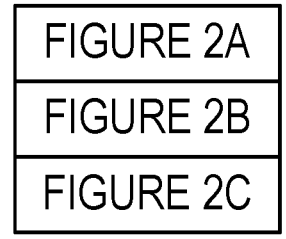
FIG. 2 comprises the combination of FIG. 2A, FIG. 2B and FIG. 2C.
Figure 2A:
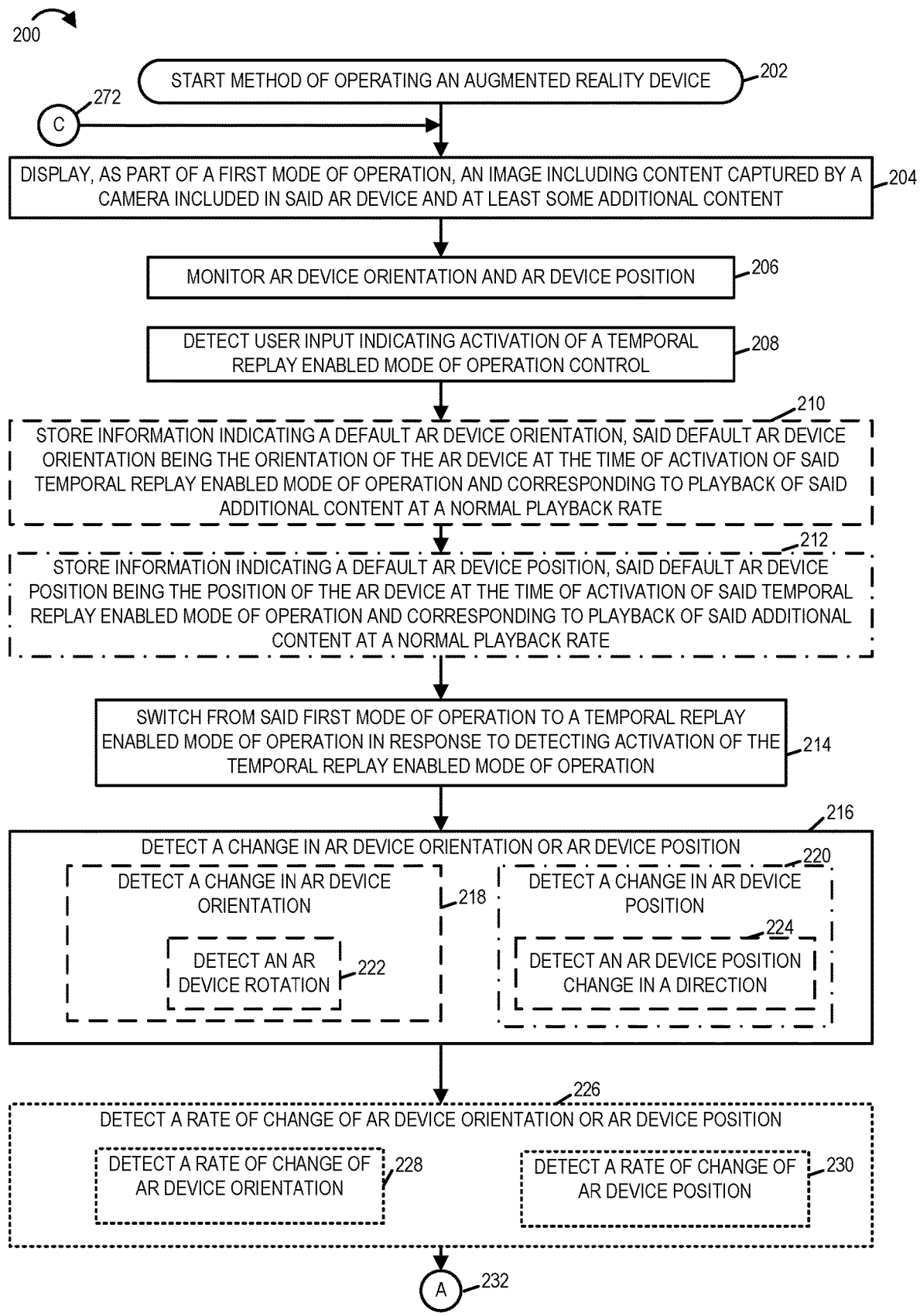
FIG. 2A is a first part of a flowchart of an exemplary method of operating an augmented reality device in accordance with an exemplary embodiment.
Figure 2B:
FIG. 2B is a second part of a flowchart of an exemplary method of operating an augmented reality device in accordance with an exemplary embodiment.
Figure 3:
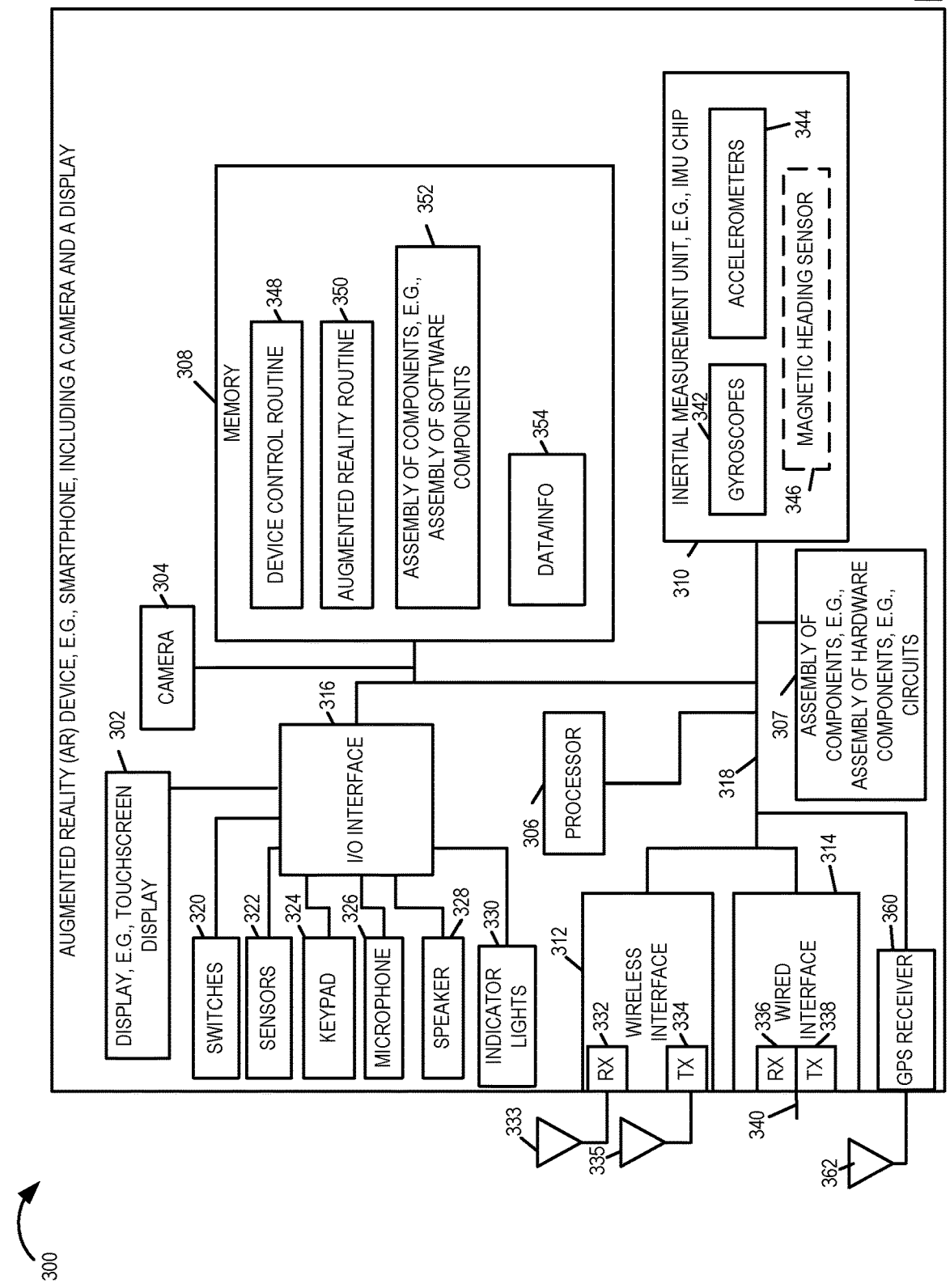
FIG. 3 is a drawing of an exemplary augmented reality device, e.g., a smartphone including a camera and a display, in accordance with an exemplary embodiment.

FIG. 2, comprising the combination of FIG. 2A, FIG. 2B and FIG. 2C, is a flowchart 200 of an exemplary method of operating an augmented reality device, e.g., AR device 120 or 122 of FIG. 1, AR device 300 of FIG. 3 or AR device 602, in accordance with an exemplary embodiment.

Operation of the exemplary method starts in step 202 in which the augmented reality (AR) device is powered on and initialized. Operation proceeds from step 202 to step 204. In step 204 the augmented reality device displays, as part of a first mode of operation, an image including content captured by a camera included in the AR device and at least some additional content. Operation proceeds from step 204 to step 206.

In step 206 the AR device monitors AR device orientation and AR device position. Operation proceeds from step 206 to step 208. In step 208 the AR device detects user input indicating activation of a temporal replay enabled mode of operation. In some embodiments, operation proceeds from step 208 to step 210. In other embodiments, operation proceeds from step 208 to step 214.

In step 210 the AR device stores information indicating a default AR device orientation, said default AR device orientation being the orientation of the AR device at the time of the activation of said temporal replay enabled mode of operation and corresponding to playback of said additional content at a normal playback rate. Operation proceeds from step 210 to step 212.

In step 212 the AR device stores information indicating a default AR device position, said default AR device position being the position of the AR device at the time of the activation of said temporal replay enabled mode of operation and corresponding to playback of said additional content at a normal playback rate. Operation proceeds from step 212 to step 214.

In step 214 the AR device switches from said first mode of operation to a temporal replay enabled mode of operation in response to detecting activation of the temporal replay enabled mode of operation. Operation proceeds from step 214 to step 216.

In step 216 the AR device detects a change in AR device orientation or AR device position. Step 216 includes one or both of steps 218 and 220. In step 218 the AR device detects a change in AR device orientation. In some embodiments, step 218 includes step 222 in which the AR device detects an AR device rotation. In step 220 the AR device detects a change in AR device position. In some embodiments, step 220 includes step 224 in which the AR device detects an AR device position change in a direction. In some embodiments, operation proceeds from step 216 to step 225. In some embodiments, operation proceeds from step 216, via connecting node A 232, to step 234.

In step 226 the AR device detects a rate of change of AR device orientation or AR device position. In some embodiments, step 226 includes one or both of steps 228 and 230. In step 228 the AR device detects a rate of change of AR device orientation. In step 230 the AR device detects a rate of change of AR device position. Operation proceeds from step 226, via connecting node A 232, to step 234.

In step 234, the AR device controls a temporal playback operation based on the detected change in AR device orientation or AR device position while in said temporal replay enabled mode of operation. In some embodiments, step 234 includes one or both of steps 236 and 238.

In step 236 the AR device controls a temporal playback operation based on the detected change in AR device orientation while in said temporal replay enabled mode of operation. In some embodiments, step 236 includes steps 240, 242, 244, 246, 248 and 248.

In step 240 the AR device monitors to detect a rotation from said default AR device orientation by a predetermined amount, said predetermined amount being an amount which triggers a temporal trick play playback operation, said temporal trick play playback operation being one of a fast forward operation of a reverse operation. Operation proceeds from step 240 to step 242. In step 242 the AR device initiates, in response to detecting the rotation from the default AR device orientation by a predetermined amount, implementing the temporal trick play playback operation. Operation proceeds from step 242 to step 244. In step 244 the AR device performs a temporal trick play playback operation, said temporal trick play playback operation being one of: i) a fast forward operation in response to a detected AR device rotation in a first direction or ii) a reverse operation in response to a detected AR device rotation in a second direction. Step 244 includes steps 246, 248 and 250. In step 246 the AR device detects from the direction of the detected AR device rotation whether to implement a reverse or fast forward operation, a fast forward operation being implemented in response to a rotation in a first direction, e.g., a clockwise rotation, and a reverse operation being implemented in response to a rotation in a second direction, e.g., a counterclockwise rotation. In some embodiments, operation proceeds from step 246 to step 248. In some embodiments, operation proceeds from step 246 to step 250. In step 248 the AR device controls the temporal rate, e.g., fast forward or reverse speed, of the temporal trick play playback operation based on the amount of detected rotation. In step 250 the AR device controls a rate of fast forward or reverse playback operation as a function of the rate of change of the AR device orientation.

In step 252 the AR device monitors to detect a position change from said default AR device position by a predetermined amount, said predetermined amount being an amount which triggers a temporal trick play playback operation, said temporal trick play playback operation being one of a fast forward operation of a reverse operation. Operation proceeds from step 252 to step 254. In step 254 the AR device initiates, in response to detecting the position change from the default AR device position by a predetermined amount, implementing the temporal trick play playback operation. Operation proceeds from step 254 to step 256. In step 256 the AR device performs a temporal trick play playback operation, said temporal trick play playback operation being one of: i) a fast forward operation in response to a detected AR device position change in a first direction or ii) a reverse operation in response to a detected AR device position change in a second direction, Step 256 includes step 258, 260 and 262. In step 258 the AR device detects from the direction of the detected AR device position change whether to implement a reverse or fast forward operation, a fast forward operation being implemented in response to a position change in a first direction, and a reverse operation being implemented in response to a position change in a second direction. In some embodiments, operation proceeds from step 258 to step 260. In some embodiments, operation proceeds from step 258 to step 262. In step 260 the AR device controls the temporal rate, e.g., fast forward or reverse speed, of the temporal trick play playback operation based on the amount of detected position change. In step 262 the AR device controls a rate of fast forward or reverse playback operation as a function of the rate of change of the AR device position.

In step 238 the AR device controls a temporal playback operation based on the detected change in AR device position while in said temporal replay enabled mode of operation. In some embodiments, step 238 includes steps 252, 254, 256, 258, 260 and 262.

Operation proceeds from step 234, via connecting node B 264, to step 266. In step 266 the AR device switches from a fast forward or reverse temporal rate of playback operation to a normal temporal rate of playback operation in response to detecting an AR device orientation indicating a rotation to an orientation in which temporal trick play operation is not enabled or in response to detecting an AR device position indicating a position change to a position in which temporal trick play operation is not enabled. Step 266 includes one or both of steps 268 and 270.

In step 268 the AR device switches from a fast forward or reverse temporal rate of playback operation to a normal temporal rate of playback operation in response to detecting an AR device orientation indicating a rotation to an orientation in which temporal trick play operation is not enabled. In step 270 the AR device switches from a fast forward or reverse temporal rate of playback operation to a normal temporal rate of playback operation in response to detecting an AR device position indicating a position change to a position in which temporal trick play operation is not enabled. Operation proceeds from step 266, via connecting node C 272, to step 204.

FIG. 3 is a drawing of an exemplary augmented reality device, e.g., a smartphone including a camera and a display, in accordance with an exemplary embodiment. AR device 300 is, e.g., AR device 120 or 122 of FIG. 1 or AR device 602. Augmented reality device 300 includes a camera 304, a processor 306, e.g., a CPU, an assembly of components 307, e.g., assembly of hardware components, e.g., circuits, memory 308, an inertial measurement unit (IMU) 310, e.g., an IMU chip, a wireless interface 312, a wired interface 314, and an I/O interface 316 coupled together via a bus 318 over which the various elements may interchange data and information.

Device 300 further includes display 302, e.g., a touch screen display, switches 320, sensors 322, a keypad 324, a microphone 326, speaker 328, and indicator lights 330, which are coupled to bus 318 via I/O interface 316. Wireless interface 312 includes a wireless receiver 332 coupled to receive antenna 333, via which device 300 may receive wireless signals, and a wireless transmitter 334 coupled to transmit antenna 335, via which device 300 may transmit wireless signals. Wired interface 314 includes a receiver 336, via which device 300 may receive signals via connection 340, e.g., a coax or fiber optic line or Ethernet line, and transmitter 338 via which device 300 may transmit signals via connection 340.

Inertial measurement unit 310 includes gyroscopes 342, e.g., 3 single axis gyroscopes with sensing axis orthogonal to one another, and accelerometers 344, e.g., 3 accelerometers in a triad to measure acceleration along 3 orthogonal axis. In some embodiments, IMU 310 further includes a magnetic heading sensor 346. Device 300 further includes a GPS receiver 360 coupled to GPS antenna 362, via which the GSP receiver receives GSP signals from GPS satellites. GPS receiver 360 is coupled to bus 318.

Memory 308 includes a device control routine 348, an augmented reality routine 350, an assembly of components 352, e.g., an assembly of software components, and data/information 354.

Figure 4:
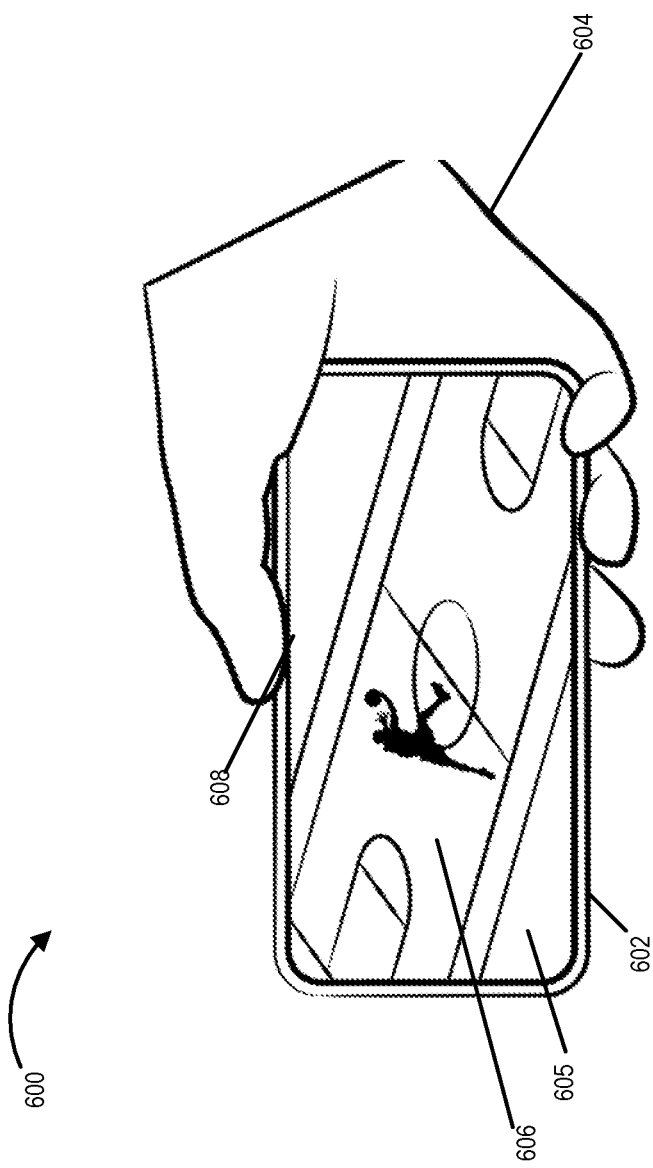
FIG. 4 is a drawing illustrating an exemplary augmented reality device, which is held by a user's hand.

FIG. 4 is a drawing 600 illustrating an exemplary augmented reality device 602, which is held by a user's hand 604. Augmented reality device 602 is displaying on its screen, an image including image portion 605, e.g., a portion of a table top, which has been captured by the camera in device 602 and image portion 606 which is additional content provided from an outside source. In this example, the basketball court region including the player is additional content. The region outside the boundaries of the basketball court is an image captured by the camera of device 602, and is, e.g., a portion of a table top.

FIG. 4 also identifies area 608 of the touch screen display of device 602, which is used as an input detection device, e.g., a touch screen toggle switch input sensor, for detecting user input indicating activation of a temporal replay enabled mode of operation.

Figure 5:
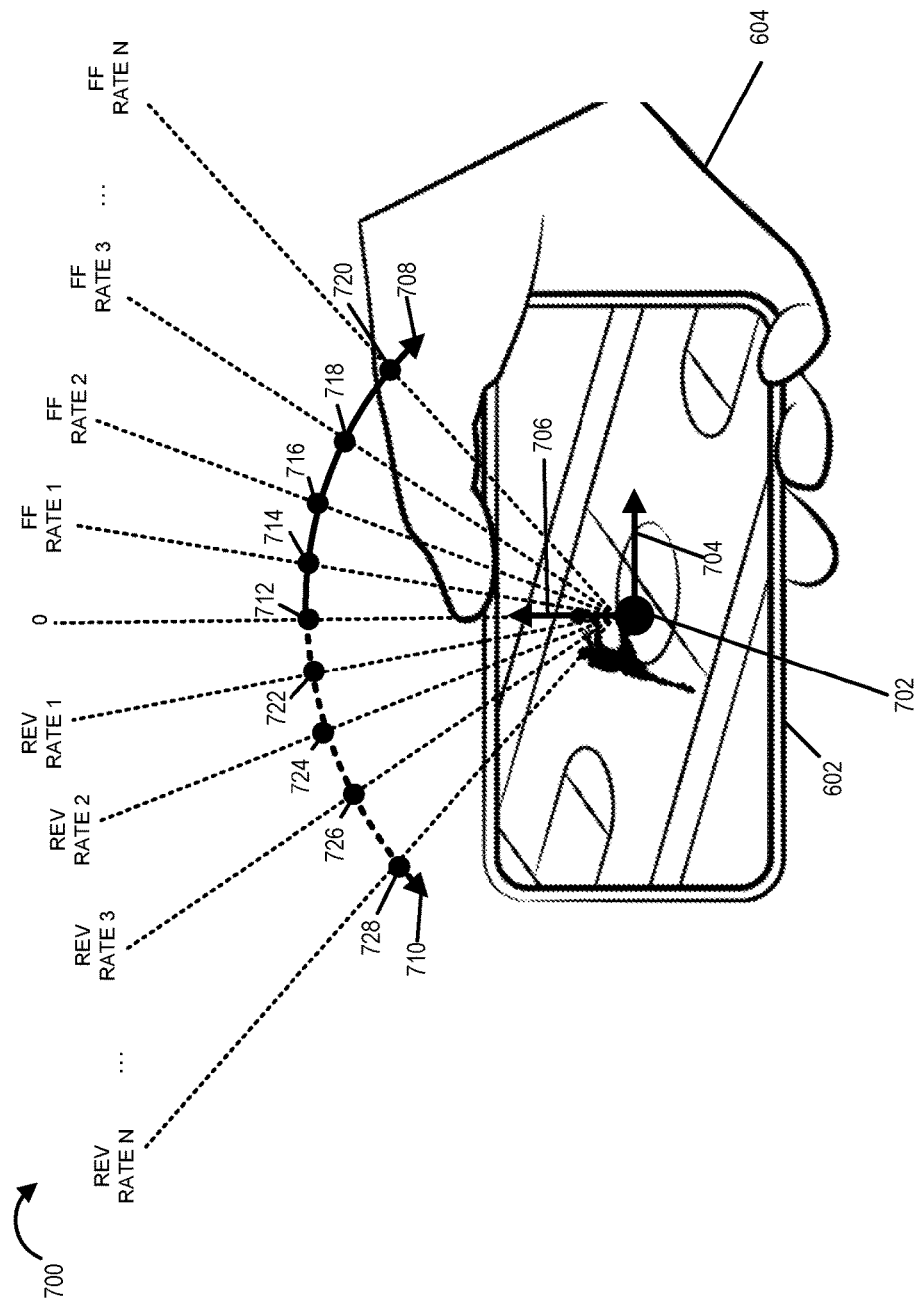
FIG. 5 is a drawing illustrating augmented reality device and various features in accordance with one exemplary embodiment.

FIG. 5 is a drawing 700 illustrating augmented reality device 602 and various features in accordance with one exemplary embodiment. Device 602 has orthogonal device body axis (702, 704, 706). Device body axis 702 comes out of the page and represents an input optical axis of the camera in device 602. When in temporal replay enabled mode, a rotation about axis 702 in the direction indicated by arrow 708 is used to set the fast forward (FF) rate. Consider that the initial reference point is 712, which represents the initial orientation (starting point) angle of 0 degrees rotation about axis 702.

If the camera is rotated to an angle corresponding to point 714, the FF playback rate is rate 1, e.g., 2×. If the camera is rotated to an angle corresponding to point 716, the FF playback rate is rate 2, e.g., 4×. If the camera is rotated to an angle corresponding to point 716, the FF playback rate is rate 3, e.g., 8×. If the camera is rotated to an angle corresponding to point 718, the FF playback rate is rate N.

When in temporal replay enabled mode, a rotation about axis 702 in the direction indicated by dashed line arrow 710 is used to set the reverse (REV) rate. Consider that the initial reference point is 712, which represents the initial orientation (starting point) angle of 0 degrees rotation about axis 702.

If the camera is rotated to an angle corresponding to point 722, the REV playback rate is rate 1, e.g., 2×. If the camera is rotated to an angle corresponding to point 724, the REV playback rate is rate 2, e.g., 4×. If the camera is rotated to an angle corresponding to point 726, the REV playback rate is rate 3, e.g., 8×. If the camera is rotated to an angle corresponding to point 718, the REV playback rate is rate N.

Thus in the example of FIG. 5, different orientations of the camera with respect to an initial reference orientation are used to set different FF or REV playback rates.

In an alternative embodiment, orientation changes of device 602 with respect to rotations about axis 704 are used to set and control FF and REV rates in a similar manner as described with respect to FIG. 5. In another alternative embodiment, orientation changes of device 602 with respect to rotations about axis 706 are used to set and control FF and REV rates in a similar manner as described with respect to FIG. 5.

In some alternative embodiments, a determined position change of device 602 with respect to an initial position of device 602 is used to set and control FF and REV rates in a similar manner as described with respect to FIG. 5, e.g., with AR device position being used instead of AR device orientations and with different determined changes is position corresponding to different FF and REV playback rates.

Figure 6:
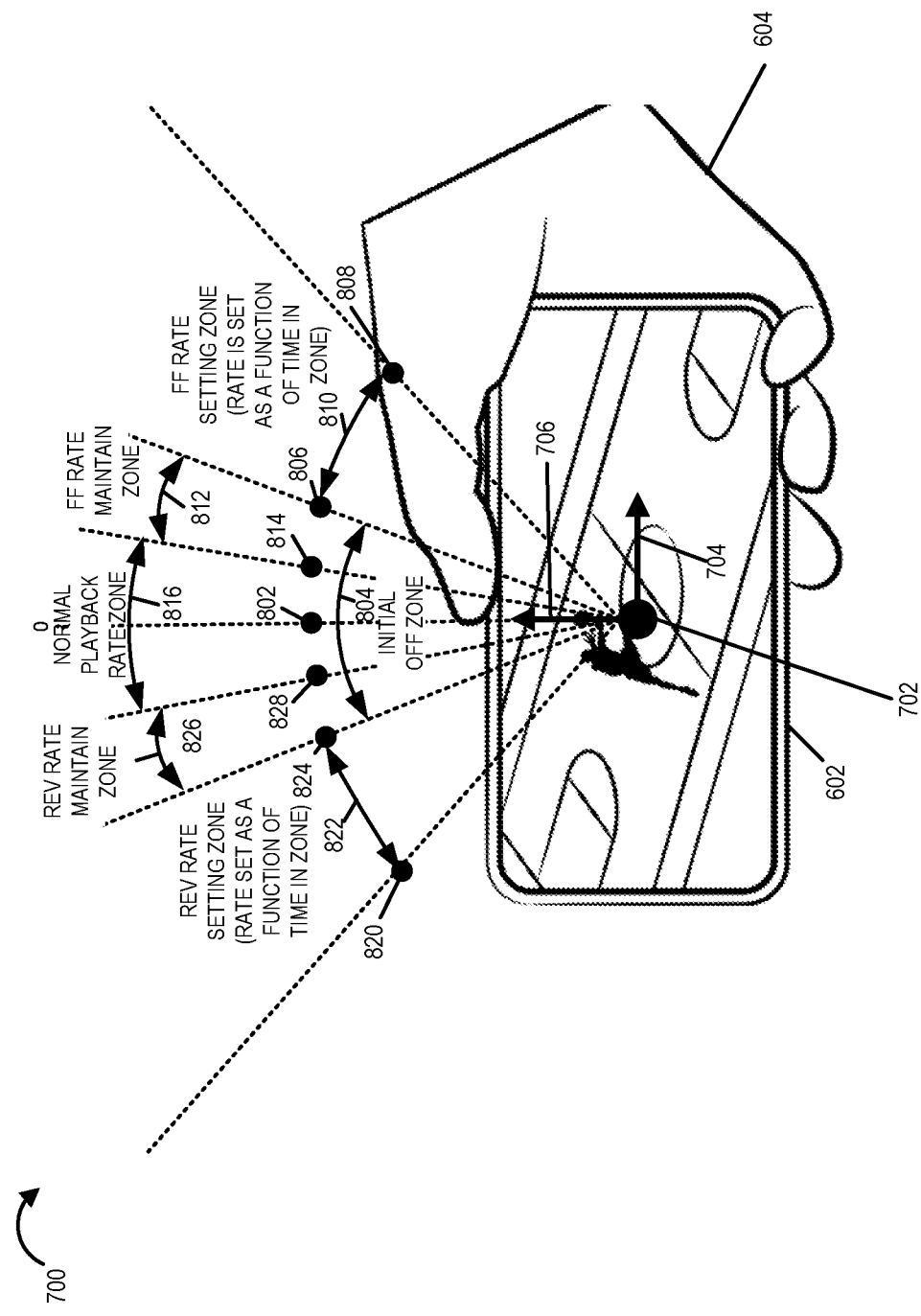
FIG. 6 is a drawing illustrating augmented reality device and various features in accordance with another exemplary embodiment.

FIG. 6 is a drawing 800 illustrating augmented reality device 602 and various features in accordance with another exemplary embodiment. Device 602 has orthogonal device body axis (702, 704, 706). Device body axis 702 comes out of the page and represents an input optical axis of the camera in device 602. In the example, of FIG. 6, consider that temporal replay enabled mode is entered with the angle about axis 702 being 0 degrees corresponding to point 802.

There is an initial off zone 804. If the rotation of the AR device 602 stays within zone 804 the FF or REV rate is not set. However, if the rotation of AR device 602 about axis 702 reaches an activation angle corresponding to point 806, the FF rate setting is activated and the FF rate value starts increases as a function of how long the AR device 602 remains in FF rate setting zone 810, which is between point 806 and 808. When the user decides that the desired FF rate has been achieved, the user rotates the AR device 602 about axis 702, to enter the FF maintain zone 812, which is between points 806 and 814. While the AR device 602 is in zone 812 the AR device maintains the FF rate which has been set by being in the FF rate setting zone, with the set rate being a function of the time in FF rate setting zone 810. If the AR device is rotated to normal playback rate zone 816, which is between points 814 and 828, the FF rate is set the normal forward playback rate, e.g., 1×.

Consider an example for REV playback. Further consider that AR device 602 enters temporal enabled mode, with angel about axis 702 being 0 degrees corresponding to point 802 in initial off zone 804. If the rotation of the AR device 602 stays within zone 804 the FF or REV rate is not set. However, if the rotation of AR device 602 about axis 702 reaches an activation angle corresponding to point 824, the REV rate setting is activated and the REV rate value starts increasing as a function of how long the AR device 602 remains in REV rate setting zone 822, which is between points 824 and 820. When the user decides that the desired REV rate has been achieved, the user rotates the AR device 602 about axis 702, to enter the REV rate maintain zone 825, which is between points 824 and 828. While the AR device 602 is in zone 826 the AR device maintains the REV rate which has been set by being in the REV rate setting zone, with the set rate being a function of the time in REV rate setting zone 822. If the AR device is rotated to normal playback rate zone 816, which is between points 828 and 814, the REV rate is set the normal reverse playback rate, e.g., 1×.

In the example of FIG. 6, to set a FF rate or a REV rate for playback, the AR device 600 is rotated beyond a rate setting activation angle, to achieve an orientation within a range setting zone, and the duration within the range setting zone is used to determine the FF or REV rate. Then, by rotating reorienting the AR device to orient the AR device into a FF or REV rate maintenance zone, the set rate is maintained for the duration that the AR device remains oriented to be within the rate maintenance zone.

In an alternative embodiment, orientation changes of device 602 with respect to rotations about axis 704 are used to set and control FF and REV rates in a similar manner as described with respect to FIG. 6. In another alternative embodiment, orientation changes of device 602 with respect to rotations about axis 706 are used to set and control FF and REV rates in a similar manner as described with respect to FIG. 6.

In some alternative embodiments, a determined position changes of device 602 with respect to an initial position of device 602 are used to set and control FF and REV rates in a similar manner as described with respect to FIG. 6, e.g., with AR device position being used instead of AR device orientations, and with different position ranges corresponding to: an initial OFF zone, a FF setting zone, a FF maintain zone, a normal playback zone, a REV setting zone, and a REV maintain zone. In some embodiments, the position change, which is used to set and control FF/REV rates is along one of axis 702, 704 or 706.

Figure 7:
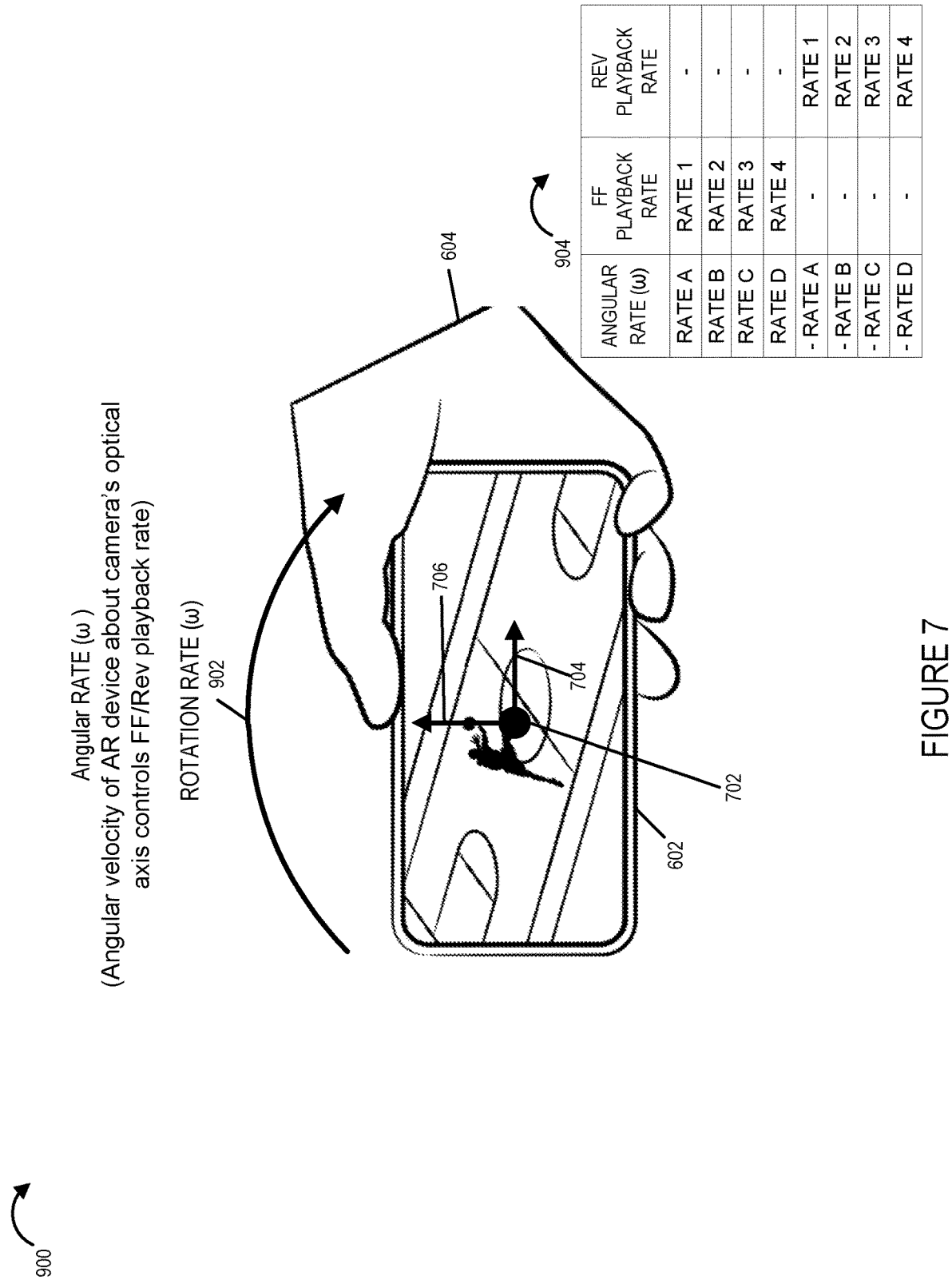
FIG. 7 is a drawing illustrating augmented reality device and various features in accordance with another exemplary embodiment.

FIG. 7 is a drawing 900 illustrating augmented reality device 602 and various features in accordance with another exemplary embodiment. Device 602 has orthogonal device body axis (702, 704, 706). Device body axis 702 comes out of the page and represents an input optical axis of the camera in device 602. In the example, of FIG. 7, consider that temporal replay enabled mode is entered with the angle about axis 702 being 0 degrees and with the camera device being stationary or substantially stationary, and having an angular rate ω 902 of about axis 702=0 degrees/sec, e.g., after removing effects of earth's rotational rate. Note described angular rate ω 902 is an angular rate after compensation to remove the effects of earth's rotational rate.

In this embodiment a detected angular rates about axis 702, e.g., caused by the user with hand 704 rotating AR device 602 about axis 702, is used to determine and set the FF/REV playback rate to be controlled to a particular level. Table 904 shows exemplary detected angular rates of AR device 602 and corresponding FF playback rates or REV playback rates. If the rotational rate ω 902 is rate A, then the playback is controlled to be a FF playback with rate 1, e.g., 2× speed. If the rotational rate ω 902 is rate B, then the playback is controlled to be a FF playback with rate 2, e.g., 4× speed. If the rotational rate ω 902 is rate C, then the playback is controlled to be a FF playback with rate 3, e.g., 8× speed. If the rotational rate ω 902 is rate D, then the playback is controlled to be a FF playback with rate 4, e.g., 16× speed. If the rotational rate ω 902 is rate −A, then the playback is controlled to be a REV playback with rate 1, e.g., 2× speed. If the rotational rate ω 902 is rate −B, then the playback is controlled to be a REV playback with rate 2, e.g., 4× speed. If the rotational rate ω 902 is rate −C, then the playback is controlled to be a REV playback with rate 3, e.g., 8× speed. If the rotational rate ω 902 is rate −D, then the playback is controlled to be a REV playback with rate 4, e.g., 16× speed.

In one exemplary embodiment, the value of A is less than the value of B, which is less than the value of C, which is less than the value of D, where A, B, C and D are positive values. In some such embodiments, rate 1 is less that rate 2, which is less than rate 3, which is less than rate 4, where rate 1, rate 2, rate 3, and rate 4 are positive values.

In some embodiments, rate A is a first range of rates, rate B is a second range of rates, rate C is a third range of rates, and rate D is a fourth range of rates.

In an alternative embodiment, angular rates of device 602 about axis 704 are used to set and control FF and REV rates in a similar manner as described with respect to FIG. 6. In another alternative embodiment, angular rates of device 602 about axis 706 are used to set and control FF and REV rates in a similar manner as described with respect to FIG. 7.

Figure 8:
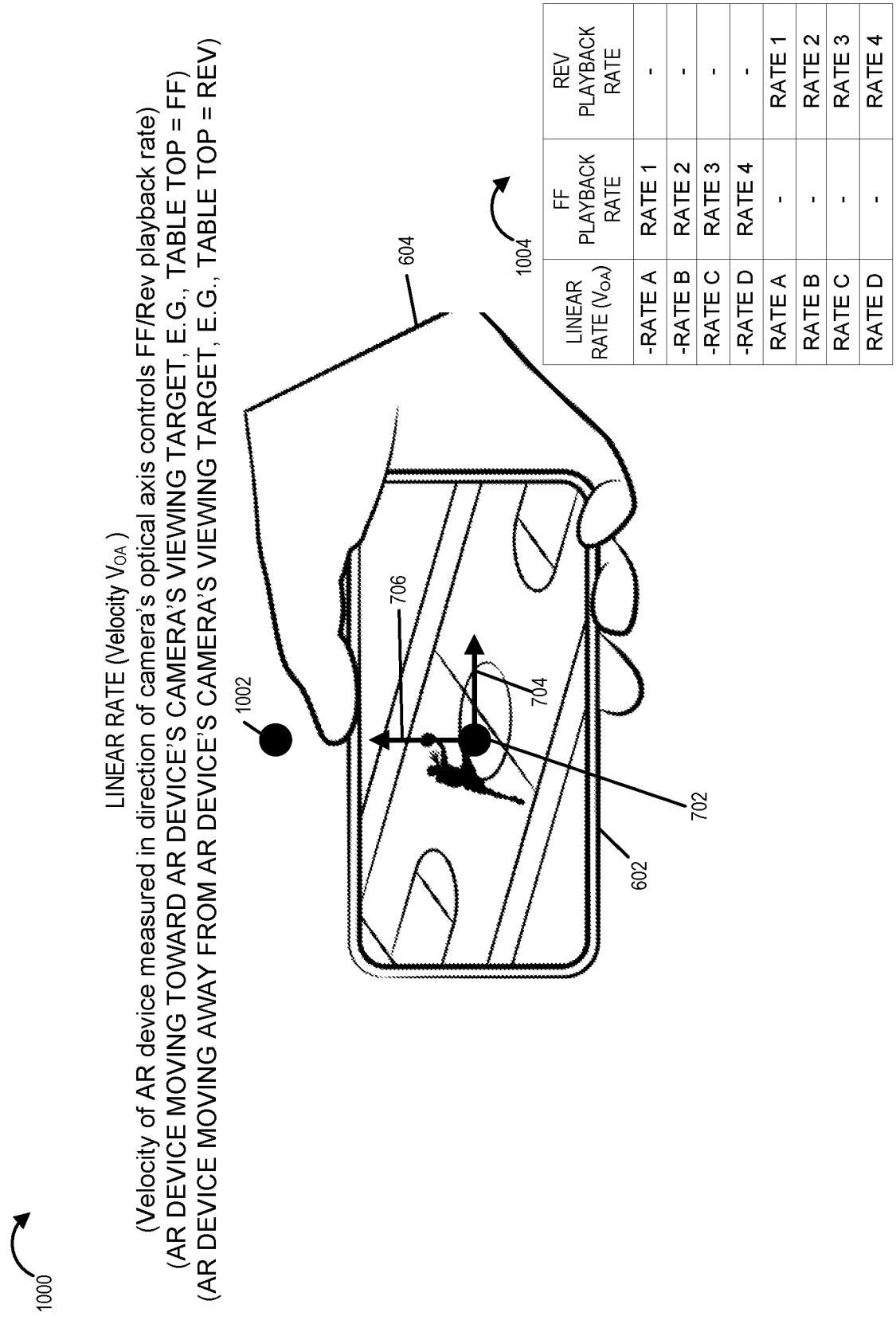
FIG. 8 is a drawing illustrating augmented reality device and various features in accordance with another exemplary embodiment.

FIG. 8 is a drawing 1000 illustrating augmented reality device 602 and various features in accordance with another exemplary embodiment. Device 602 has orthogonal device body axis (702, 704, 706). Device body axis 702 comes out of the page and represents an input optical axis of the camera in device 602. In the example, of FIG. 8, consider that temporal replay enabled mode is entered with the camera device 602 being stationary or substantially stationary, and located at an initial point and having a velocity (VOA) 1002 of 0 or substantially 0. Consider that (VOA) 1002 is a velocity vector along optical axis 702.

In this embodiment a detected linear velocity 1002 along axis 702, e.g., caused by the user with hand 704 moving the AR device 602 along axis 702 toward a camera viewing target, e.g., a table top, or away from a camera viewing target, e.g., a table top, is used to determine and set the FF/REV playback rate to be controlled to a particular level. Table 1004 shows exemplary detected linear velocity rates VOA 1002 of AR device 602 and corresponding FF playback rates or REV playback rates. If the rates VOA 1002 is rate A, then the playback is controlled to be a FF playback with rate 1, e.g., 2× speed. If the rates VOA 1002 is rate B, then the playback is controlled to be a FF playback with rate 2, e.g., 4× speed. If the rates VOA 1002 is rate C, then the playback is controlled to be a FF playback with rate 3, e.g., 8× speed. If the rates VOA 1002 is rate D, then the playback is controlled to be a FF playback with rate 4, e.g., 16× speed. If the rates VOA 1002 is rate −A, then the playback is controlled to be a REV playback with rate 1, e.g., 2× speed. If the rates VOA 1002 is rate −B, then the playback is controlled to be a REV playback with rate 2, e.g., 4× speed. If the rates VOA 1002 is rate −C, then the playback is controlled to be a REV playback with rate 3, e.g., 8× speed. If the rates VOA 1002 is rate −D, then the playback is controlled to be a REV playback with rate 4, e.g., 16× speed.

In one exemplary embodiment, the value of A is less than the value of B, which is less than the value of C, which is less than the value of D, where A, B, C and D are positive values. In some such embodiments, rate 1 is less that rate 2, which is less than rate 3, which is less than rate 4, where rate 1, rate 2, rate 3, and rate 4 are positive values.

In some embodiments, rate A is a first range of rates, rate B is a second range of rates, rate C is a third range of rates, and rate D is a fourth range of rates.

Thus, in the exemplary embodiment, of FIG. 8, the velocity of AR device is measured in the direction of the camera's optical axis and the determined value is used to control the FF/REV playback rate. If the AR device 602 is determined to be moving toward the viewing target, e.g., a table top, (or away from the user) FF is selected and the FF playback rate is set as a function of the determined speed of AR device 602. Alternatively, if the AR device 602 is determined to be moving away from the viewing target, e.g., a table top, (or toward from the user) REV is selected and the REV playback rate is set as a function of the determined speed of AR device 602.

In an alternative embodiment, linear rates of device 602 along axis 704 are used to set and control FF and REV rates in a similar manner as described with respect to FIG. 8. In another alternative embodiment, linear of device 602 along axis 706 are used to set and control FF and REV rates in a similar manner as described with respect to FIG. 8.

Figure 9:
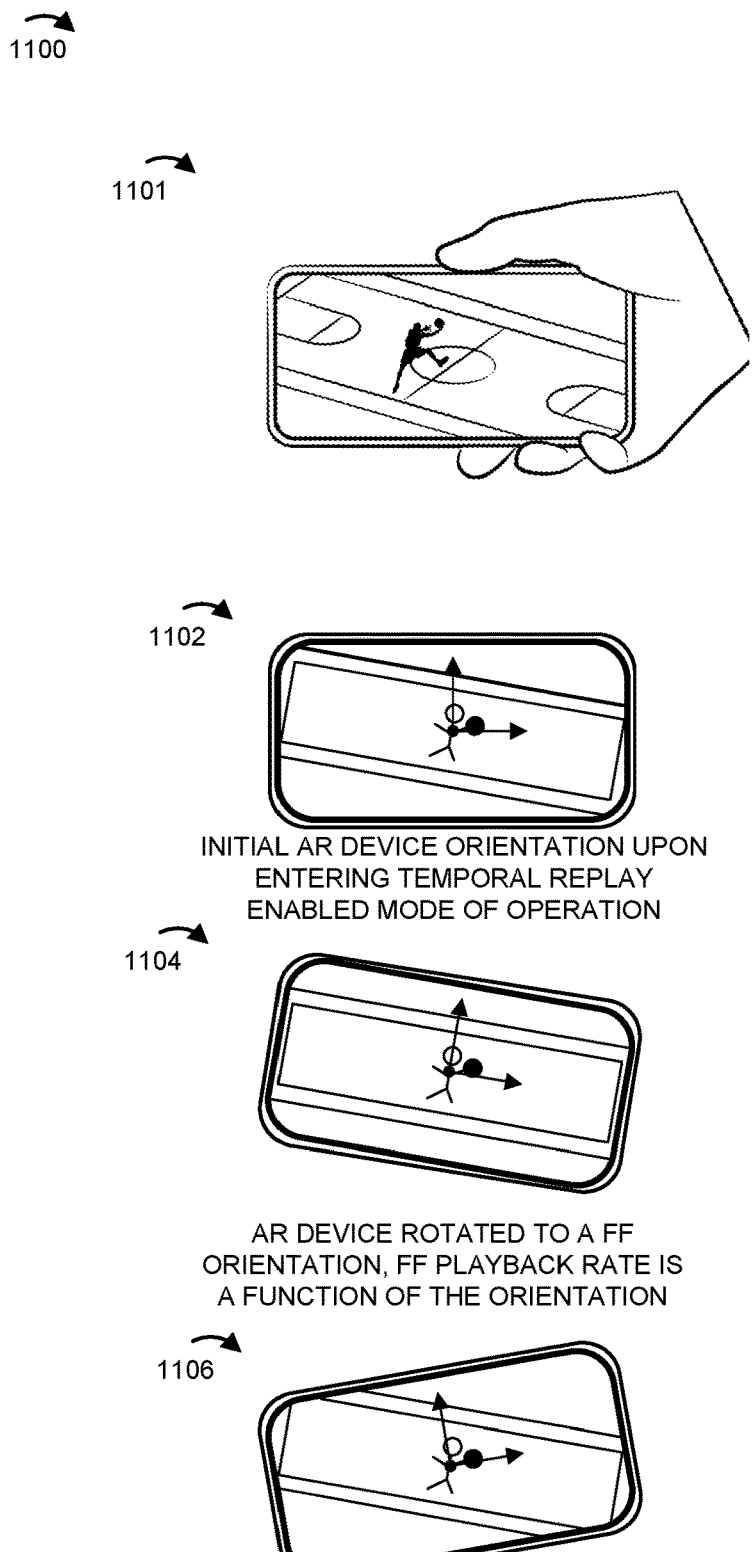
FIG. 9 illustrates an exemplary AR device being held by a user, which activates a temporal replay enabled mode of operation control, e.g., via detected user input of a thumb depressing on the top area of the touchscreen display of the AR device at a predetermined location on the screen.

FIG. 9 is a drawing including a drawing 1101 illustrating an exemplary AR device being held by a user, which activates a temporal replay enabled mode of operation control, e.g., via detected user input of a thumb depressing on the top area of the touchscreen display of the AR device at a predetermined location on the screen. FIG. 9 further illustrates simplified drawings (1102, 1104, 1106) of the AR device used to explain features of various embodiments. In drawing 1102, the VR device is shown in an initial AR device orientation upon entering the temporal replay enabled mode of operation.

In drawing 1104 the AR device is depicted after a rotation about the optical input axis of the camera in the AR device in a first direction of rotation. In this example the rotation in the first direction causes an orientation change of the AR device from the initial reference orientation of drawing 1102. The AR device detects the direction and amount of rotation and performs a temporal trick play playback operation, which is a fast forward operation in response to the detected rotation the first direction, and the temporal fast forward speed is based on the amount of detected rotation, e.g., from the initial AR orientation upon entering temporal replay enabled mode.

In drawing 1106 the AR device is depicted after a rotation about the optical input axis of the camera in the AR device in a second direction of rotation. In this example the rotation in the second direction causes an orientation change of the AR device from the initial reference orientation of drawing 1102. The AR device detects the direction and amount of rotation and performs a temporal trick play playback operation, which is a reverse operation in response to the detected rotation in the second direction, and the temporal reverse speed is based on the amount of detected rotation, e.g., from the initial AR orientation upon entering temporal replay enabled mode.

FIG. 9 is, e.g., an example, corresponding to the embodiment described in FIG. 5. In one such embodiment, drawing 1104 corresponds to FF rate 2, and drawing 1106 corresponds to REV rate 2.

Figures 10, 10D:
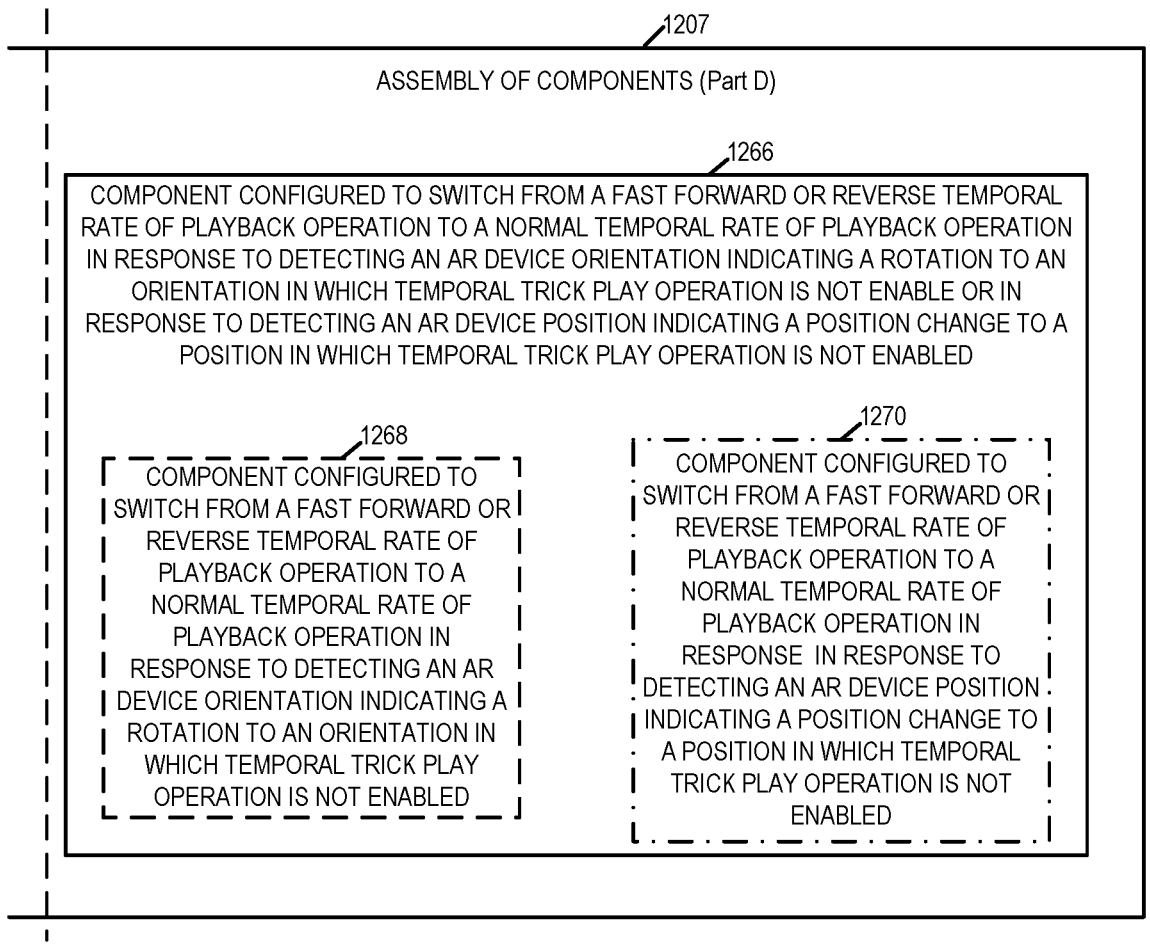
FIG. 10D is a fourth part of a drawing of an exemplary assembly of components in accordance with an exemplary embodiment.
FIG. 10 comprises the combination of FIG. 10A, FIG. 10B, FIG. 10C and FIG. 10D.
Figure 10A:
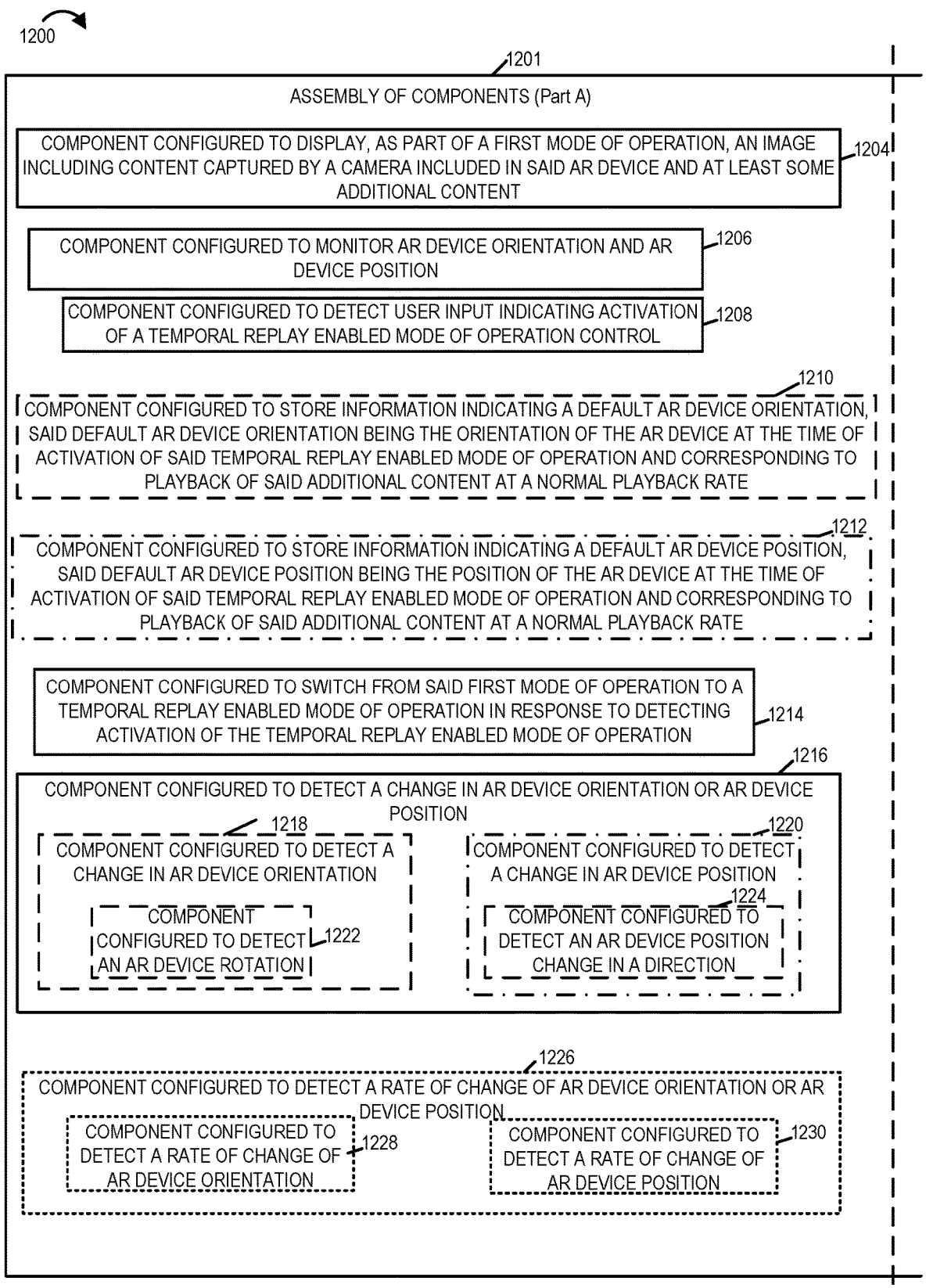
FIG. 10A is a first part of a drawing of an exemplary assembly of components in accordance with an exemplary embodiment.
Figure 10B:
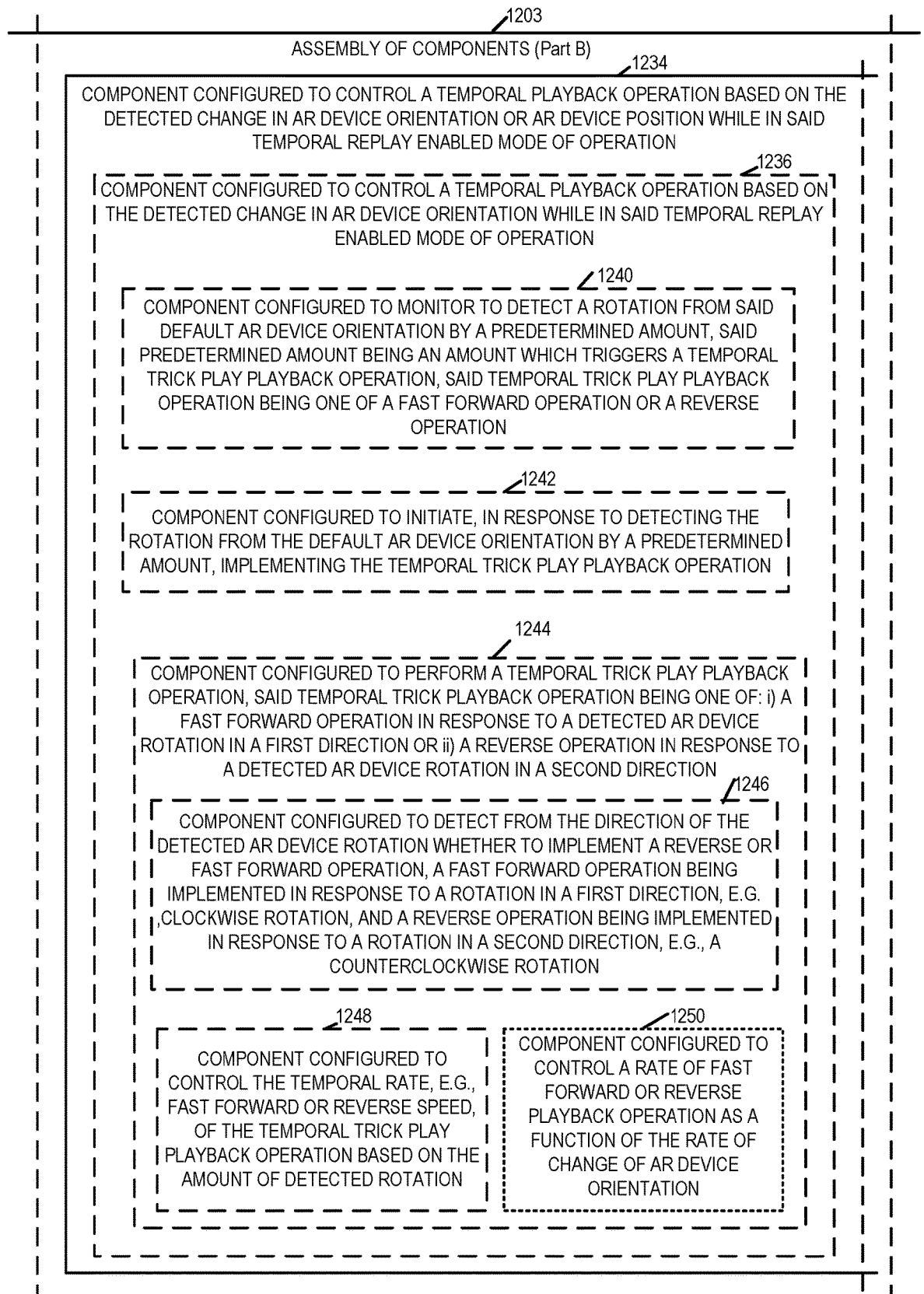
FIG. 10B is a second part of a drawing of an exemplary assembly of components in accordance with an exemplary embodiment.
Figure 10C:
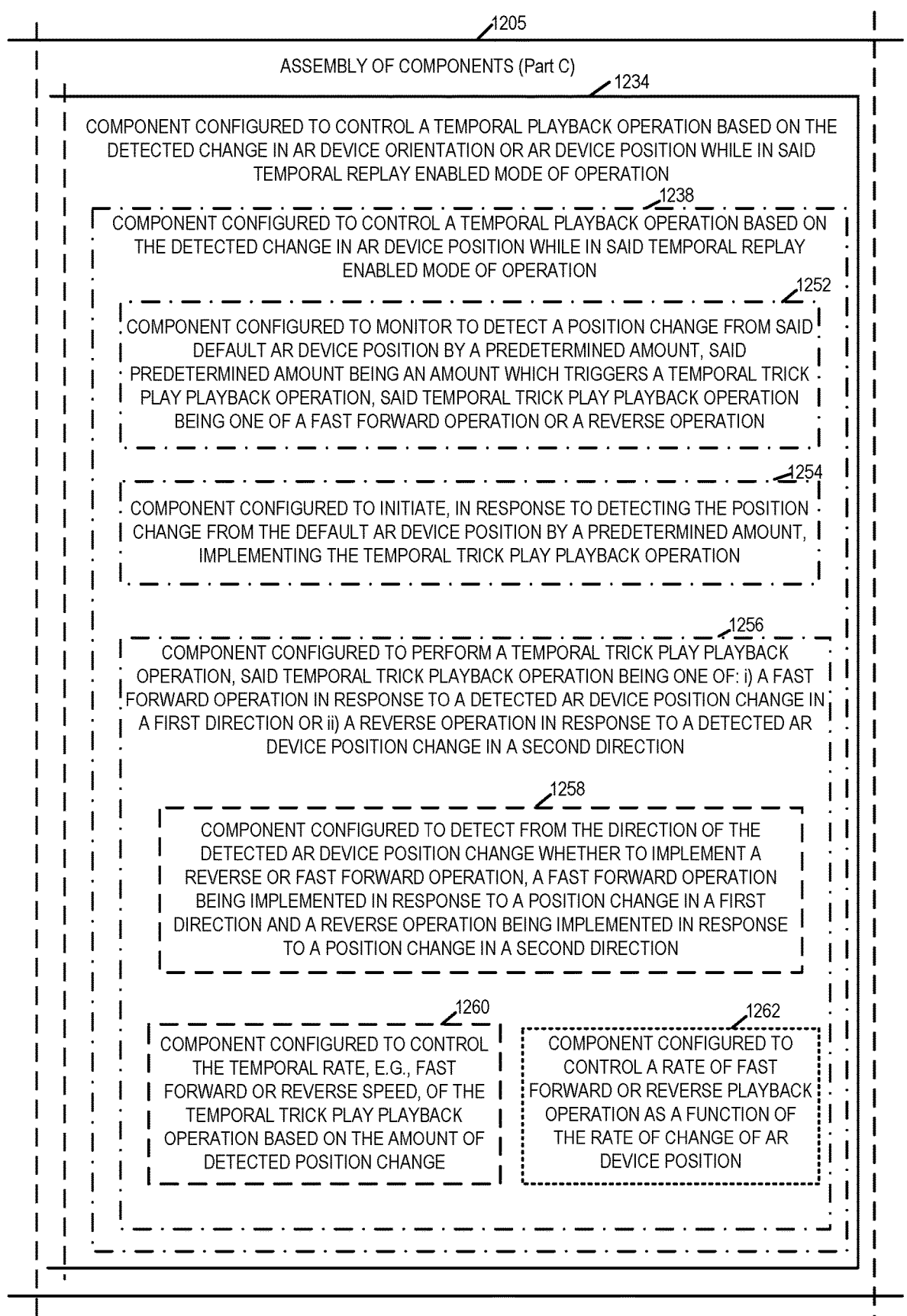
FIG. 10C is a third part of a drawing of an exemplary assembly of components in accordance with an exemplary embodiment.

FIG. 10, comprising the combination of FIG. 10A, FIG. 10B, FIG. 10C and FIG. 10D, is a drawing of an exemplary assembly of components 1200, comprising the combination of Part A 1201, Part B 1203, Part C 1205, and Part D 1207, in accordance with an exemplary embodiment. Assembly of components 1200 may be included in an exemplary augmented reality device, e.g. augmented reality device 300 of FIG. 3, which may implement the method of flowchart 200 of FIG. 2.

The exemplary components show in FIG. 10 can be implemented in software, hardware or a combination of software and hardware depending on the embodiment. When implemented fully in hardware the components are sometimes implemented as circuits. When implemented in software the components can be stored in memory until executed by a processor, e.g. the processor of the augmented reality device such as the one shown in FIG. 3, implementing the method in accordance with the invention.

Components in the assembly of components 1201 shown in FIG. 10, implementing corresponding steps of the method shown in FIG. 2 are identified in FIG. 10 using reference numbers which include a "1" before the reference number of the corresponding step shown in FIG. 2. For example component 1204 implements, or controls an augmented reality device, such as the one shown in FIG. 3, to implement step 204 shown in FIG. 2. Since the operations, e.g., steps, implemented by the components have already been described the components will not be described further but to show the correspondence between the number of the component shown in FIG. 10 and the corresponding step of the method shown in FIG. 2. Set forth below as a set of numbered pairs is an indication of the correspondence between the described step of FIG. 2 and the numbered component of FIG. 10A to show the correspondence: (204, 1204), (206,1206), (208, 1208), (210, 1210), (212, 1212), (214, 1214), (216, 1216) (228, 1228), (218, 1218), (222, 1222), (220, 1220), (224, 1224), (226, 1226), (228, 1228), (230, 1230), (234, 1234), (236, 1236), (238, 1238), (240, 1240), (242, 1242), (244, 1244), (246, 1246), (248, 1248), (250, 1250), (238, 1238), (252, 1252), 254, 1254), (256, 1256), (258, 1258), 260, 1260), (262, 1262), (266, 1266), (268, 1268), (270, 1270), The exemplary assembly of components 1200 may be included in an exemplary AR device 300 of FIG. 3 in accordance with an exemplary embodiment. The components in the assembly of components 1200 can, and in some embodiments are, implemented fully in hardware within the processor 306, e.g., as individual circuits. The components in the assembly of components 1200 can, and in some embodiments are, implemented fully in hardware within the assembly of components 307, e.g., as individual circuits corresponding to the different components. In other embodiments some of the components are implemented, e.g., as circuits, within the processor 306 with other components being implemented, e.g., as circuits within assembly of components 307, external to and coupled to the processor 306. As should be appreciated the level of integration of components on the processor and/or with some components being external to the processor may be one of design choice. Alternatively, rather than being implemented as circuits, all or some of the components may be implemented in software and stored in the memory 308 of the AR device 300, with the components controlling operation of AR device 300 to implement the functions corresponding to the components when the components are executed by a processor, e.g., processor 306. In some such embodiments, the assembly of components 1200 is included in the memory 308 as assembly of components 352. In still other embodiments, various components in assembly of components 1200 are implemented as a combination of hardware and software, e.g., with another circuit external to the processor 306 providing input to the processor 306 which then under software control operates to perform a portion of a component's function. While processor 306 is shown in the FIG. 3 embodiment as a single processor, e.g., computer, it should be appreciated that the processor 306 may be implemented as one or more processors, e.g., computers.

When implemented in software the components include code, which when executed by the processor 306, configure the processor 306 to implement the function corresponding to the component. In embodiments where the assembly of components 1200 is stored in the memory 308, the memory 308 is a computer program product comprising a computer readable medium comprising code, e.g., individual code for each component, for causing at least one computer, e.g., processor 306, to implement the functions to which the components correspond.

Completely hardware based or completely software based components may be used. However, it should be appreciated that any combination of software and hardware, e.g., circuit implemented components may be used to implement the functions. As should be appreciated, the components illustrated in FIG. 10 control and/or configure the AR device 300 or elements therein such as the processor 306, to perform the functions of corresponding steps illustrated and/or described in the method of one or more of the flowcharts, signaling diagrams and/or described with respect to any of the Figures. Thus the assembly of components 1200 includes various components that perform functions of corresponding one or more described and/or illustrated steps of an exemplary method, e.g., steps of an exemplary method of flowchart 200 of FIG. 2.

Figure 11:
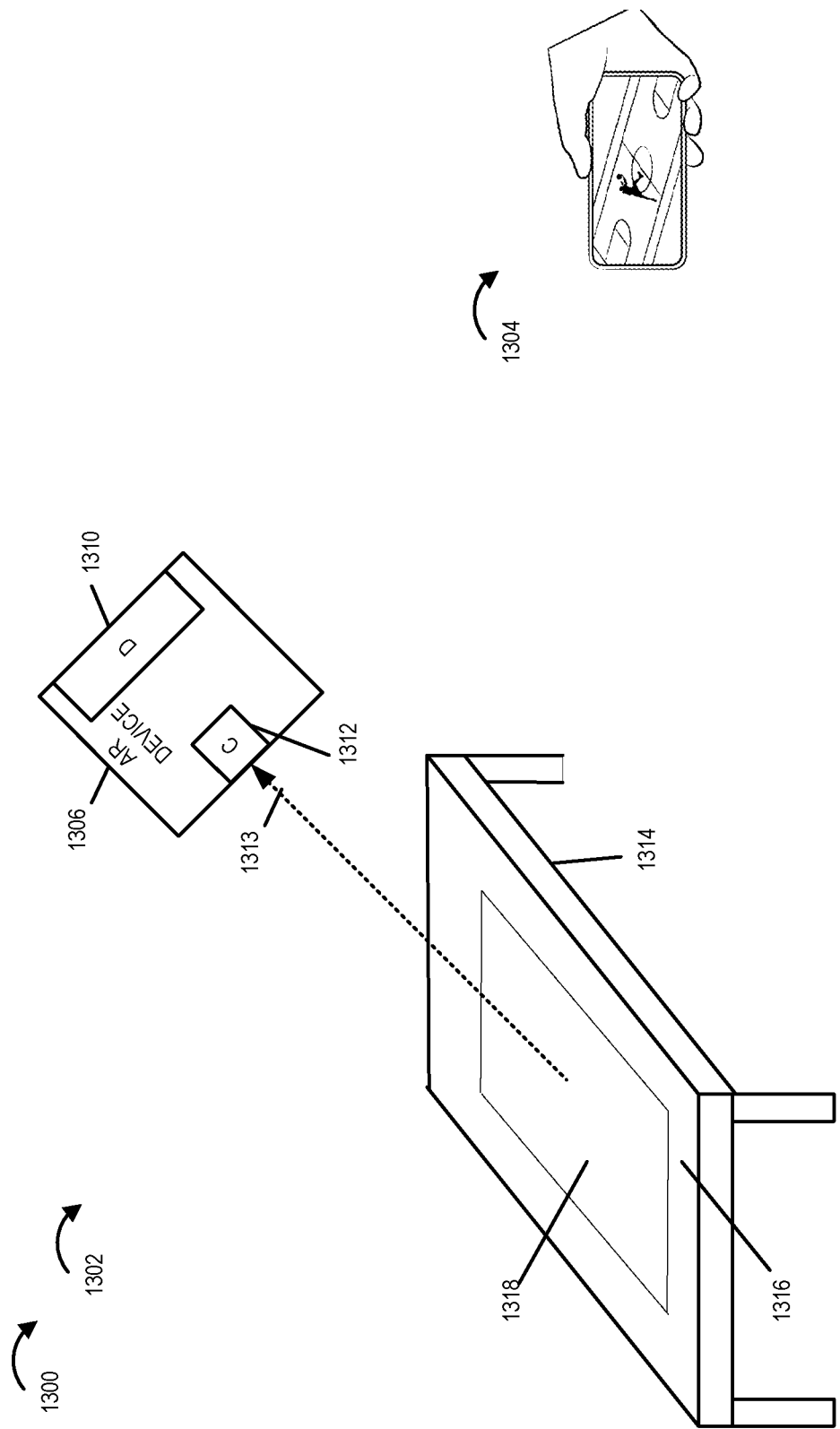
FIG. 11 is a drawing including a drawing of an exemplary AR device environment and a drawing of an exemplary AR device including a displayed AR image in accordance with an exemplary embodiment.

FIG. 11 is a drawing 1300 including a drawing 1302 of an exemplary AR device environment and a drawing 1304 of an exemplary AR device including an displayed AR image in accordance with an exemplary embodiment. AR device 1306 is, e.g., AR device 120 or AR device 122 of FIG. 1 or AR device 300 of FIG. 3 or AR device 602. Drawing 1302 includes AR device 1306 and table 1314. AR device 1306 includes camera 1312 with optical axis 1313 and display 1310. Table 1314 includes table top 1316. Portion 1318 of table top 1316 shows area onto which the additional content, e.g., images of a football playing field or basketball court including players, will be inserted.

An image captured by the camera 1312 of AR device 1306 will show a portion of table top 1316, when the camera in AR device 1206 is pointed at the table top 1316. However, when the AR device 1306 is operating to display AR images, the display 1310 on AR device 1306 will display image content captured by the camera 1312, e.g., an outside portion of table top 1316, and some additional content, e.g., images captured by a image capture system located at a sporting event, e.g., a portion of a basketball court including a player.

Drawing 1304 shows the display 1310 of AR device 1306 displaying an AR image while the camera in AR device 1306 is directed toward the center of area 1318 on table top 1316. Thus the AR images make it appear as if the basketball game was being played on the top of table 1316, with the court and players being miniature in size.

In accordance with a feature of various embodiments, when displaying an AR image, user input, e.g., a thumb touch on a predetermined portion of the display, can be detected and used to switch from a first mode of operation to a temporal replay enabled mode of operation. Then detected changes in AR device orientation and/or AR device position can be, and sometimes are, used to control temporal playback operation, e.g., control fast forward and/or control reverse of the additional image content being displayed along with the captured image content from camera 1312, while in the temporal replay enabled mode of operation.

Numbered List of Exemplary Method Embodiments

Method Embodiment 1 A method of operating a playback device (e.g., AR device such as a smartphone with a camera and display), the method comprising: displaying, as part of a first mode of operation, an image including content captured by a camera included in said playback device and at least some additional image content; detecting user input indicating activation of a temporal replay enabled mode of operation control (e.g., a touch screen toggle that can be touched by a user's finger, e.g., thumb, while the playback device is being held by one or both hands); and switching from said first mode of operation to a temporal replay enabled mode of operation in response to detecting activation of the temporal replay enabled mode of operation control.

Method Embodiment 2 The method of Method Embodiment 1, wherein said additional image content is content corresponding to a sporting event.

Method Embodiment 3 The method of Method Embodiment 1, wherein said additional content is video content.

Method Embodiment 4 The method of Method Embodiment 1, wherein the playback device is an AR device, the method further comprising: detecting a change in AR device orientation or AR device position; and controlling a temporal playback operation (e.g., fast forward or reverse of the additional image content being displayed with the captured image content) based on the detected change in AR device orientation or AR device position, while in said temporal replay enabled mode of operation.

Method Embodiment 5 The method of Method Embodiment 1, wherein the playback device is an AR device, the method further comprising: detecting a change in AR device orientation; and controlling a temporal playback operation (e.g., fast forward or reverse of the additional image content being displayed with the captured image content) based on the detected change in AR device orientation while in said temporal replay enabled mode of operation.

Method Embodiment 6 The method of Method Embodiment 4, further comprising: detecting a rate of change of AR device orientation or AR device position (e.g., angular velocity or linear velocity); and controlling a rate of fast forward or reverse playback operation as a function of said rate of change (e.g., fast change=fast rate of fast forward or reverse, slow change=slow rate of fast forward or reverse).

Method Embodiment 7 The method of Method Embodiment 1, further comprising: detecting a change in AR device position; and controlling a temporal playback operation (e.g., fast forward or reverse of the additional image content being displayed with the captured image content) based on the detected change in AR device position, while in said temporal replay enabled mode of operation.

Method Embodiment 8 The method of Method Embodiment 4, wherein detecting a change in AR device orientation includes detecting an AR device rotation (e.g., around the optical axis of the camera); and wherein controlling said temporal playback operation includes performing a temporal trick play playback operation, said temporal trick play playback operation being one of i) a fast forward operation in response to a detected AR device rotation in a first direction (e.g., clockwise) or ii) a reverse operation in response to a detected AR device rotation in a second direction (e.g., counter clockwise).

Method Embodiment 9 The method of claim 8, further comprising: storing information indicating a default AR device orientation, said default AR device orientation being the orientation of the AR device at the time of activation of said temporal replay enabled mode of operation and corresponding to playback of said additional content at a normal playback rate; wherein controlling said temporal playback operation further includes: monitoring to detect a rotation from said default AR device orientation by a predetermined amount, said predetermined amount being an amount which triggers a temporal trick play playback operation, said temporal trick play playback operation being one of said fast forward operation or said reverse operation; and initiating, in response to detecting the rotation from said default AR device orientation by a predetermined amount implementing the temporal trick play playback operation.

Method Embodiment 10 The method of Method Embodiment 7, further comprising: storing information indicating a default AR device position, said default AR device position being the position of the AR device at the time of activation of said temporal replay enabled mode of operation and corresponding to playback of said additional content at a normal playback rate.

Method Embodiment 11 The method of claim 1, further comprising: determining from the direction of the detected AR device rotation whether to implement a reverse or fast forward operation, a fast forward operation being implemented in response to a clockwise rotation and a reverse operation being implemented in response to a counterclockwise rotation.

Method Embodiment 12 The method of Method Embodiment 11, further comprising: controlling the temporal rate, e.g., fast forward or reverse speed, of the temporal trick play playback operation based on the amount of detected rotation.

Method Embodiment 13 The method of Method Embodiment 11, further comprising: controlling the temporal rate, e.g., fast forward or reverse speed, of the temporal trick play playback operation based on the amount of time the detected rotation continues to exceed the rotation used to enable the temporal trick play playback operation (e.g., how long the AR device remains rotated in a position which enables fast forward or reverse operation).

Method Embodiment 14 The method of Method Embodiment 9, further comprising: switching from a fast forward or reverse temporal rate of playback operation to a normal temporal rate of playback operation (e.g. with respect to the additional content being displayed with the live captured image content) in response to detecting an AR device orientation indicating a rotation to an orientation in which temporal trick play playback operation (fast forward or reverse) is not enabled.

While steps are shown in an exemplary order it should be appreciated that in many cases the order of the steps may be altered without adversely affecting operation. Accordingly, unless the exemplary order of steps is required for proper operation, the order of steps is to be considered exemplary and not limiting.

Some embodiments are directed a non-transitory computer readable medium embodying a set of software instructions, e.g., computer executable instructions, for controlling a computer or other device, e.g., a AR or VR device. Other embodiments are directed to a computer readable medium embodying a set of software instructions, e.g., computer executable instructions, for controlling a computer or other device, e.g., an AR or VR device.

The techniques of various embodiments may be implemented using software, hardware and/or a combination of software and hardware. Various embodiments are directed to apparatus, e.g., a system for providing stimulation to a user and detecting user responses to said stimulation. Various embodiments are also directed to methods, e.g., a method of controlling a head mounted device, providing stimulation to a user, and/or detecting user responses to stimulation. Various embodiments are also directed to a non-transitory machine, e.g., computer, readable medium, e.g., ROM, RAM, CDs, hard discs, etc., which include machine readable instructions for controlling a machine to implement one or more steps of a method.

Various features of the present invention are implemented using components. Such components may, and in some embodiments are, implemented as software components, e.g., software modules. In other embodiments the components are implemented in hardware. In still other embodiments the components are implemented using a combination of software and hardware. In some embodiments the components are implemented as individual circuits with each component being implemented as a circuit for performing the function to which the component corresponds. A wide variety of embodiments are contemplated including some embodiments where different components are implemented differently, e.g., some in hardware, some in software, and some using a combination of hardware and software. It should also be noted that routines and/or subroutines, or some of the steps performed by such routines, may be implemented in dedicated hardware as opposed to software executed on a general purpose processor. Such embodiments remain within the scope of the present invention. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods. Accordingly, among other things, the present invention is directed to a machine-readable medium including machine executable instructions for causing a machine, e.g., processor and associated hardware, to perform one or more of the steps of the above-described method(s).

In some embodiments each of the steps of the described method is performed by a processor or under the control of a processor. Various features address technical problems of how to encode and/or communicate video of a communications network such as the Internet.

Numerous additional variations on the methods and apparatus of the various embodiments described above will be apparent to those skilled in the art in view of the above description. Such variations are to be considered within the scope.

What is claimed is:

1. A method of operating a playback device, the method comprising:
   displaying image content captured by a camera of the playback device and at least some additional image content;
   detecting user input indicative of activation of a temporal replay-enabled control interface;
   switching from a first mode of operation to a temporal replay-enabled mode of operation in response to detecting activation of the temporal replay-enabled control interface; and
   detecting, in the temporal replay-enabled mode, a rotational change around an axis of the playback device, wherein, in the temporal replay-enabled mode, the rotational change of the playback device controls a playback of the at least some additional image content relative to the display of the image content captured by the camera, such that the display of the at least some additional image content is different from the playback of the image content captured by the camera.

2. The method of claim 1, wherein the additional image content comprises content corresponding to a sporting event.

3. The method of claim 1, wherein the additional image content is video content.

4. The method of claim 1, further comprising:
   controlling, during the temporal replay-enabled mode of operation, the playback of the at least some additional content relative to the playback of the image content captured by the camera based on the detected rotational change of the playback device.

5. The method of claim 4, further comprising:
   detecting a rate of rotational change of the playback device; and
   controlling a playback speed of the at least some additional content relative to the playback of the image content captured by the camera based on the rate of rotational change.

6. The method of claim 5, wherein detecting the rotational change of the playback device comprises detecting a rotation of the playback device; and
   wherein controlling the playback speed comprises performing one of i) a fast forward operation or ii) a reverse operation, wherein the fast forward operation is performed in response to rotation of the playback device in a first direction, and wherein the reverse operation is performed in response to rotation of the playback device in a second direction.

7. The method of claim 6, further comprising:
storing information indicative of a default orientation of the playback device, wherein the default orientation of the playback device comprises an orientation of the playback device at an activation time of the temporal replay-enabled mode of operation and corresponds to playback of the additional image content at a normal playback rate;
wherein controlling the playback speed further comprises:
detecting a rotation from the default orientation of the playback device that satisfies a criterion, wherein the criterion corresponds to an amount of rotation sufficient to trigger controlling the playback speed; and
initiating, in response to detecting the rotation that satisfies the criterion, controlling the playback speed.

8. The method of claim 1, further comprising:
determining a direction of a rotation of the playback device;
implementing a fast forward operation in response to a clockwise rotation of the playback device; and
implementing a reverse operation in response to a counterclockwise rotation of the playback device.

9. The method of claim 8, further comprising:
controlling a speed of the fast forward operation or the reverse operation based on an amount of detected rotation.

10. The method of claim 8, further comprising:
controlling a speed of the fast forward operation or the reverse operation based on a length of time a detected rotation exceeds a rotation used to enable the fast forward operation or the reverse operation.

11. The method of claim 7, further comprising:
detecting an orientation of the playback device indicative of a disablement of the controlling the playback speed of the at least some additional content; and
switching to the normal playback rate in response to the disablement of the controlling the playback speed.

12. The method of claim 1, further comprising adjusting, in accordance with the rotational change of the playback device, the playback of the at least some additional image content to maintain the orientation of the at least some additional image content relative to the display of the image content.

13. A playback device, comprising:
a camera;
a display;
a processor configured to:
cause to be displayed, on the display, image content captured by the camera and at least some additional image content;
detect user input indicative of activation of a temporal replay-enabled control interface;
switch from a first mode of operation to a temporal replay-enabled mode of operation in response to detecting activation of the temporal replay-enabled control interface; and
detect, in the temporal replay-enabled mode, a rotational change around an axis of the playback device, wherein, in the temporal replay-enabled mode, the rotational change of the playback device controls a playback of the at least some additional image content relative to the display of the image content captured by the camera, such that the display of the at least some additional image content is different from the playback of the image content captured by the camera.

14. The playback device of claim 13, wherein the processor is further configured to:
control, during the temporal replay-enabled mode of operation, the playback of the at least some additional image content relative to the playback of the image content captured by the camera based on the detected rotational change of the playback device.

15. The playback device of claim 14, further comprising:
an inertial measurement unit (IMU) including at least one gyroscope for measuring angular rate; and
wherein the processor is further configured to:
determine the rotational change of the playback device based on angular rate measurements from the gyroscope.

16. The playback device of claim 13, wherein the processor is further configured to:
determine a direction of a rotation of the playback device;
implementing a fast forward operation in response to a clockwise rotation of the playback device; and
implementing a reverse operation in response to a counterclockwise rotation of the playback device.

17. The playback device of claim 16, wherein the processor is further configured to:
control a speed of the fast forward operation or the reverse operation based on an amount of detected rotation.

18. The playback device of claim 16, wherein the processor is further configured to:
control a speed of the fast forward operation or the reverse operation based on a length of time a detected rotation exceeds a rotation used to enable the fast forward operation or the reverse operation.

19. The method of claim 1, wherein the image content captured by the camera comprises near real-time image content.

20. The playback device of claim 13, wherein the image content captured by the camera comprises near real-time image content.

* * * * *